(12) United States Patent
Yang et al.

(10) Patent No.: US 9,893,802 B2
(45) Date of Patent: Feb. 13, 2018

(54) METHOD FOR TRANSMITTING AND RECEIVING A SIGNAL IN CELLS HAVING DIFFERENT UPLINK-DOWNLINK CONFIGURATIONS, AND APPARATUS THEREFOR

(71) Applicant: LG ELECTRONICS INC., Seoul (KR)

(72) Inventors: Suckchel Yang, Anyang-si (KR); Joonkui Ahn, Anyang-si (KR); Dongyoun Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/219,053

(22) Filed: Jul. 25, 2016

(65) Prior Publication Data

US 2016/0337030 A1   Nov. 17, 2016

Related U.S. Application Data

(63) Continuation of application No. 14/122,552, filed as application No. PCT/KR2012/009122 on Nov. 1, 2012, now Pat. No. 9,419,762.

(Continued)

(51) Int. Cl.
| | |
|---|---|
| *H04B 7/26* | (2006.01) |
| *H04L 1/18* | (2006.01) |
| *H04L 5/00* | (2006.01) |
| *H04L 5/14* | (2006.01) |
| *H04W 72/04* | (2009.01) |

(52) U.S. Cl.
CPC ......... *H04B 7/2656* (2013.01); *H04L 1/1854* (2013.01); *H04L 1/1861* (2013.01);
(Continued)

(58) Field of Classification Search
None
See application file for complete search history.

(56) References Cited

U.S. PATENT DOCUMENTS 6,741,579 B1 * 5/2004 Choi .................... H04B 7/2643
370/337
2008/0220791 A1   9/2008 Cho et al.
(Continued)

FOREIGN PATENT DOCUMENTS

| CN | 101627564 A | 1/2010 |
| CN | 101843009 B | 7/2014 |

(Continued)

*Primary Examiner* — Anh Ngoc Nguyen
(74) *Attorney, Agent, or Firm* — Birch, Stewart, Kolasch & Birch, LLP

(57) ABSTRACT

A method and a user equipment (UE) for transmitting an uplink (UL) signal in a wireless communication system supporting carrier aggregation are discussed. The UE is configured with a plurality of cells. A first cell and a second cell operate in time division duplex (TDD) and have different TDD uplink-downlink (UL-DL) configurations. The method according to an embodiment includes determining a specific TDD UL-DL configuration having a smallest number of D subframes from among one or more TDD UL-DL configurations, each of the one or more TDD UL-DL configurations being configured as a D subframe in each D subframe of the first cell and the second cell, the D subframe indicating a downlink (DL) subframe or a subframe comprising a downlink period, a guard period, and an uplink period; and transmitting a control signal in a UL subframe in response to at least one downlink signal.

20 Claims, 20 Drawing Sheets

Related U.S. Application Data

(60) Provisional application No. 61/606,458, filed on Mar. 4, 2012, provisional application No. 61/597,113, filed on Feb. 9, 2012, provisional application No. 61/596,211, filed on Feb. 7, 2012, provisional application No. 61/586,826, filed on Jan. 15, 2012, provisional application No. 61/560,794, filed on Nov. 16, 2011, provisional application No. 61/554,483, filed on Nov. 1, 2011.

(52) U.S. Cl.
CPC ............ *H04L 1/1887* (2013.01); *H04L 5/001* (2013.01); *H04L 5/0032* (2013.01); *H04L 5/0053* (2013.01); *H04L 5/0055* (2013.01); *H04L 5/14* (2013.01); *H04L 5/143* (2013.01); *H04W 72/0413* (2013.01)

(56) References Cited

U.S. PATENT DOCUMENTS

| | | | |
|---|---|---|---|
| 2009/0046649 A1* | 2/2009 | Gao | H04L 1/1861 370/329 |
| 2009/0241004 A1 | 9/2009 | Ahn et al. | |
| 2009/0249153 A1 | 10/2009 | Zhang | |
| 2009/0279460 A1* | 11/2009 | Sarkar | H04L 1/16 370/280 |
| 2010/0290370 A1 | 11/2010 | Li et al. | |
| 2011/0310778 A1 | 12/2011 | Seo et al. | |
| 2013/0044652 A1* | 2/2013 | Wang | H04L 1/08 370/280 |
| 2013/0153298 A1 | 6/2013 | Pietraski et al. | |
| 2013/0176886 A1 | 7/2013 | Joung et al. | |
| 2014/0029489 A1 | 1/2014 | Han et al. | |

FOREIGN PATENT DOCUMENTS

| | | |
|---|---|---|
| EP | 2119053 B1 | 8/2015 |
| KR | 10-2008-0082943 A | 9/2008 |
| KR | 10-2010-088690 A | 8/2010 |
| KR | 10-2010-0091871 A | 8/2010 |
| KR | 10-2010-0139062 A | 12/2010 |
| KR | 10-1077778 B1 | 10/2011 |
| WO | WO 2010/093221 A2 | 8/2010 |

\* cited by examiner

FIG. 15

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #2 (PCC) | D | S | U | D | D | D | S | U | D | D |
| #4 (PCC) | D | S | U | U | D | D | D | D | D | D |

(a) UL-DL configuration of each CC

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #2 (PCC) | D | S | U | X | D | D | S | X | D | D |
| #4 (PCC) | D | S | U | U | D | D | D | D | D | D |

(b) collided SF configuration for half-duplex operation

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #5 (ACK/NACK) | D | S | U | D | D | D | D | D | D | D |

(c) UL-DL configuration for ACK/NACK timing

FIG. 16

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #2 (PCC) | D | S | U | D | D | D | S | U | D | D |
| #4 (PCC) | D | S | U | U | D | D | D | D | D | D |

(a) UL-DL configuration of each CC

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #2 (PCC) | D | S | U | X | D | D | S | U | D | D |
| #4 (PCC) | D | S | U | U | D | D | D | X | D | D |

(b) collided SF configuration for half-duplex operation

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #2 (ACK/NACK) | D | S | U | D | D | D | S | U | D | D |

(c) UL-DL configuration for ACK/NACK timing

FIG. 17

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #2 (PCC) | D | S | U | D | D | D | S | U | D | D |
| #4 (PCC) | D | S | U | U | D | D | D | D | D | D |

(a) UL-DL configuration of each CC

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #2 (PCC) | D | S | U | X | D | D | S | X | D | D |
| #4 (PCC) | D | S | U | U | D | D | D | D | D | D |

(b) collided SF configuration for half-duplex operation

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #1 (UL grant/PHICH) | D | S | U | U | D | D | S | U | U | D |

(c) UL-DL configuration for UL grant or PHICH timing

FIG. 18

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #2 (PCC) | D | S | U | D | D | D | S | U | D | D |
| #4 (PCC) | D | S | U | U | D | D | D | D | D | D |

(a) UL-DL configuration of each CC

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #2 (PCC) | D | S | U | X | D | D | S | U | D | D |
| #4 (PCC) | D | S | U | U | D | D | D | X | D | D |

(b) collided SF configuration for half-duplex operation

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #1 (UL grant/PHICH) | D | S | U | U | D | D | S | U | U | D |

(c) UL-DL configuration for UL grant or PHICH timing

FIG. 19

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #2 (XCC1) | D | S | U | D | D | D | S | U | D | D |
| #3 (XCC2) | D | S | U | U | U | D | D | D | D | D |

(a) UL-DL configuration of each CC

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| #2 (XCC1) | D | S | U | D | X | D | S | U | D | D |
| #3 (XCC2) | D | S | U | X | U | D | D | X | D | D |

(b) collided SF configuration for half-duplex operation

US 9,893,802 B2

METHOD FOR TRANSMITTING AND RECEIVING A SIGNAL IN CELLS HAVING DIFFERENT UPLINK-DOWNLINK CONFIGURATIONS, AND APPARATUS THEREFOR

CROSS REFERENCE TO RELATED APPLICATIONS

This application is a Continuation of copending U.S. application Ser. No. 14/122,552 filed Nov. 26, 2013, which is the National Phase of PCT/KR2012/009122 filed on Nov. 1, 2012, which claims priority under 35 U.S.C. 119(e) to U.S. Provisional Application No. 61/606,458 filed on Mar. 4, 2012, 61/597,113 filed on Feb. 9, 2012, 61/596,211 filed on Feb. 7, 2012, 61/586,826 filed on Jan. 15, 2012, 61/560,794 filed on Nov. 16, 2011, and 61/554,483 filed on Nov. 1, 2011, all of which are hereby expressly incorporated by reference into the present application.

BACKGROUND OF THE INVENTION

The present invention relates to a wireless communication system and, more particularly, to a method of transmitting and receiving a signal in a system supporting Time Division Duplex (TDD) and an apparatus for the same.

Wireless communication systems have been widely deployed to provide various types of communication services such as voice or data. In general, a wireless communication system is a multiple access system that supports communication among multiple users by sharing available system resources (a bandwidth, transmit power, etc.) thereamong. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

SUMMARY OF THE INVENTION

An object of the present invention is to provide a method of efficiently transmitting and receiving a signal in a wireless communication system supporting TDD and an apparatus for the same.

Another object of the present invention is to provide a method of efficiently transmitting and receiving a signal in a case in which a plurality of component carriers having different uplink-downlink configurations is carrier aggregated in a system supporting TDD and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

In an aspect of the present invention, there is provided a method for transmitting an uplink (UL) signal in a wireless communication system supporting Carrier Aggregation, the method including configuring a first cell having a first Time Division Duplex (TDD) Uplink-Downlink (UL-DL) configuration and a second cell having a second TDD UL-DL configuration, receiving data in a DL subframe of the first cell, and transmitting a control signal in a UL subframe of the second cell in response to reception of the data, wherein a relationship between the DL subframe and the UL subframe is decided by a parameter value of a specific TDD UL-DL configuration selected from a TDD UL-DL configuration set, wherein the specific TDD UL-DL configuration is a TDD UL-DL configuration having the smallest number of DL subframes from among one or more TDD UL-DL configurations in which all subframes configured to DL or X on the first cell or the second cell configured as DL, and wherein a subframe configured to X indicates a subframe in which a subframe direction of the first cell is different from a subframe direction of the second cell and one of the first cell or the second cell is restricted for use.

In another aspect of the present invention, there is provided a user equipment configured to transmit an uplink (UL) signal in a wireless communication system supporting Carrier Aggregation, the user equipment including a Radio Frequency (RF) unit and a processor, wherein the processor is configured to configure a first cell having a first Time Division Duplex (TDD) Uplink-Downlink (UL-DL) configuration and a second cell having a second TDD UL-DL configuration, receive data in a DL subframe of the first cell, and transmit a control signal in a UL subframe of the second cell in response to reception of the data, wherein a relationship between the DL subframe and the UL subframe is decided by a parameter value of a specific TDD UL-DL configuration selected from a TDD UL-DL configuration set, wherein the specific TDD UL-DL configuration is a TDD UL-DL configuration having the smallest number of DL subframes from among one or more TDD UL-DL configurations in which all subframes configured to DL or X on the first cell or the second cell are configured as DL, and wherein a subframe configured to X indicates a subframe in which a subframe direction of the first cell is different from a subframe direction of the second cell in a corresponding subframe timing and one of the first cell or the second cell is restricted for use.

Control signals transmitted in a first UL subframe and a second UL subframe of the second cell may be transmitted through different Physical Uplink Control Channel (PUCCH) formats.

The control signal may be an Acknowledgement/Negative Acknowledgement (ACK/NACK) signal and control signals transmitted in a first UL subframe and a second UL subframe of the second cell may be transmitted based according to a multi-bit ACK coding scheme or an ACK/NACK selection scheme.

The first cell is may be a secondary cell and the second cell may be a primary cell.

The wireless communication system may operate based on a half-duplex operation and each subframe of the first cell may be configured to X in a subframe timing in which a subframe direction of the first cell is different from a subframe direction of the second cell.

According to the present invention, it is possible to efficiently transmit and receive a signal in a wireless communication system supporting TDD. In addition, it is possible to efficiently transmit and receive a signal even in a case in which a plurality of component carriers having different TDD UL-DL configurations is carrier aggregated in a wireless communication system supporting TDD.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings

FIGS. 15 and 16 illustrate ACK/NACK timing according to an embodiment of the present invention;

FIGS. 17 and 18 illustrate a UL grant/Physical Hybrid ARQ Indicator CHannel (PHICH) timing scheme for UL data transmission during cross-carrier (cross-CC) scheduling according to an embodiment of the present invention;

FIG. 19 illustrates a method of setting a collided subframe configuration in a case in which cross-CC scheduling is not set according to an embodiment of the present invention.

DETAILED DESCRIPTION OF THE INVENTION

Embodiments of the present invention may be used in various wireless access systems such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented as a radio technology such as Universal Terrestrial Radio Access (UTRA) or CDMA2000. TDMA may be implemented as a radio technology such as Global System for Mobile communications/General Packet Radio Service/Enhanced Data Rates for GSM Evolution (GSM/GPRS/EDGE). OFDMA may be implemented as a radio technology such as IEEE 802.11 (Wi-Fi), IEEE 802.16 (WiMAX), IEEE 802.20, and Evolved-UTRA (E-UTRA). UTRA is a part of Universal Mobile Telecommunication System (UMTS). Third Generation Partnership Project Long Term Evolution (3GPP LTE) is a part of Evolved-UMTS (E-UMTS) using E-UTRA. 3GGP LTE adopts OFDMA on a downlink and SC-FDMA on an uplink. Long Term Evolution Advanced (LTE-A) is an evolution of 3GPP LTE.

For clarity, the description focuses on 3GPP LTE/LTE-A. However, the technical features of the present invention are not limited thereto. In addition, specific terms used in the following description are provided to aid in understanding of the present invention. These specific terms may be replaced with other terms within the technical concept of the present invention.

Figure 1:
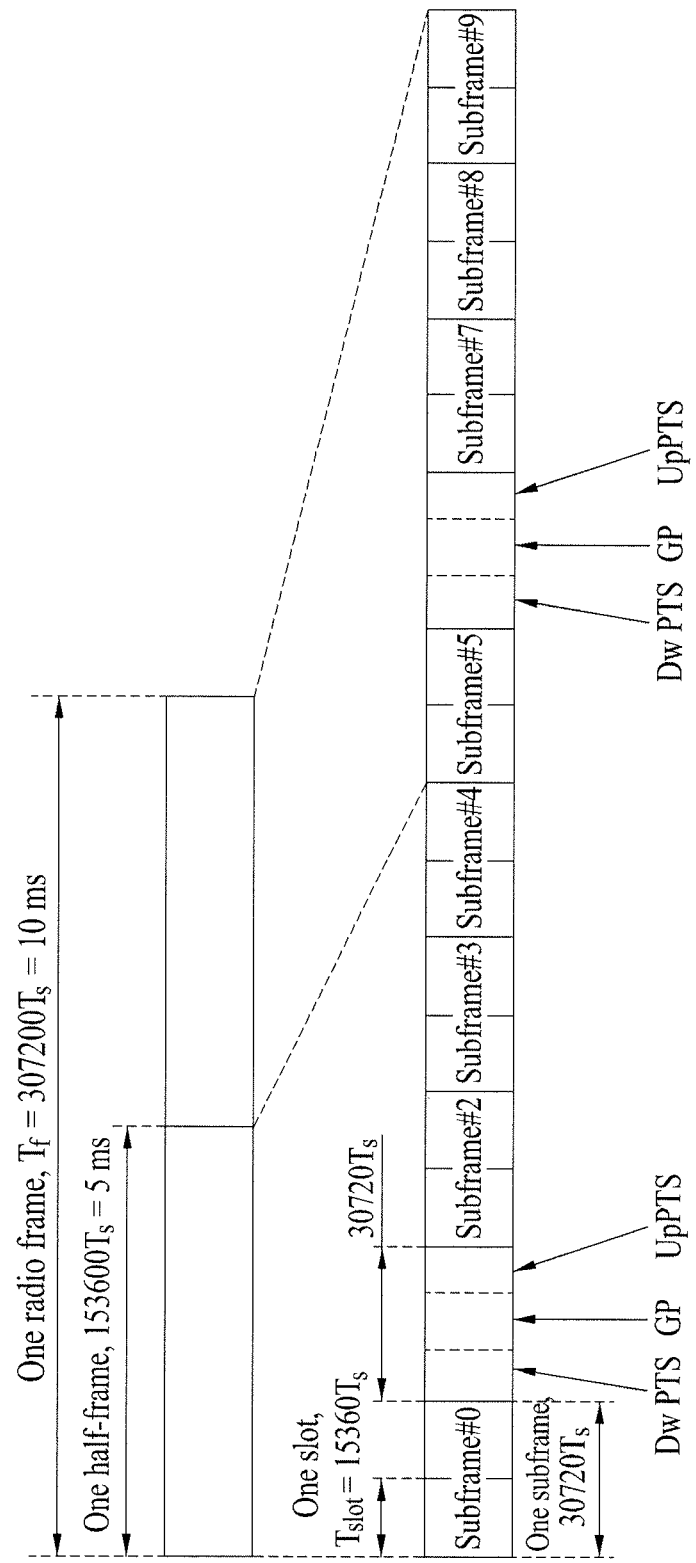
FIG. 1 illustrates a structure of a radio frame.

FIG. 1 illustrates a structure of a radio frame.

Referring to FIG. 1, a 3GPP LTE(-A) radio frame is 10 ms ($307200T_s$) in duration. The radio frame is divided into 10 subframes of equal size. Subframe numbers may be assigned to 10 subframes in each radio frame, respectively. $T_s$ denotes sampling time, where $T_s=1/(2048\times15$ kHz$)$. Each subframe is 1 ms long and is divided into two slots. Consequently, 20 slots are sequentially numbered from 0 to 19 per radio frame. Duration of each slot is 0.5 ms. A time interval in which one subframe is transmitted is defined as a transmission time interval (TTI). Time resources may be distinguished by radio frame numbers (or radio frame indexes), subframe numbers (or subframe indexes), slot numbers (or slot indexes), and the like.

The radio frame may have different configurations according to a duplex mode. Since downlink transmission and uplink transmission are discriminated according to frequency in a Frequency Division Duplex (FDD) mode, a radio frame may include either downlink subframes or uplink subframes in a specific frequency band. Since downlink transmission and uplink transmission are discriminated according to time in a Time Division Duplex (TDD) mode, on the other hand, the frame includes both downlink subframes and uplink subframes in a specific frequency band.

In particular, FIG. 1 shows a structure of a radio frame for TDD which is used in 3GPP LTE(-A). Table 1 indicates Uplink-Downlink (DL-UL) configurations of subframes in a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D indicates a downlink subframe, U indicates an uplink subframe, and S indicates a special subframe. The special subframe includes a Downlink Pilot TimeSlot (DwPTS), a Guard Period (GP), and an Uplink Pilot Time Slot (UpPTS). The DwPTS is a time interval reserved for downlink transmission and the UpPTS is a time interval reserved for uplink transmission. Table 2 illustrates special subframe configurations.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
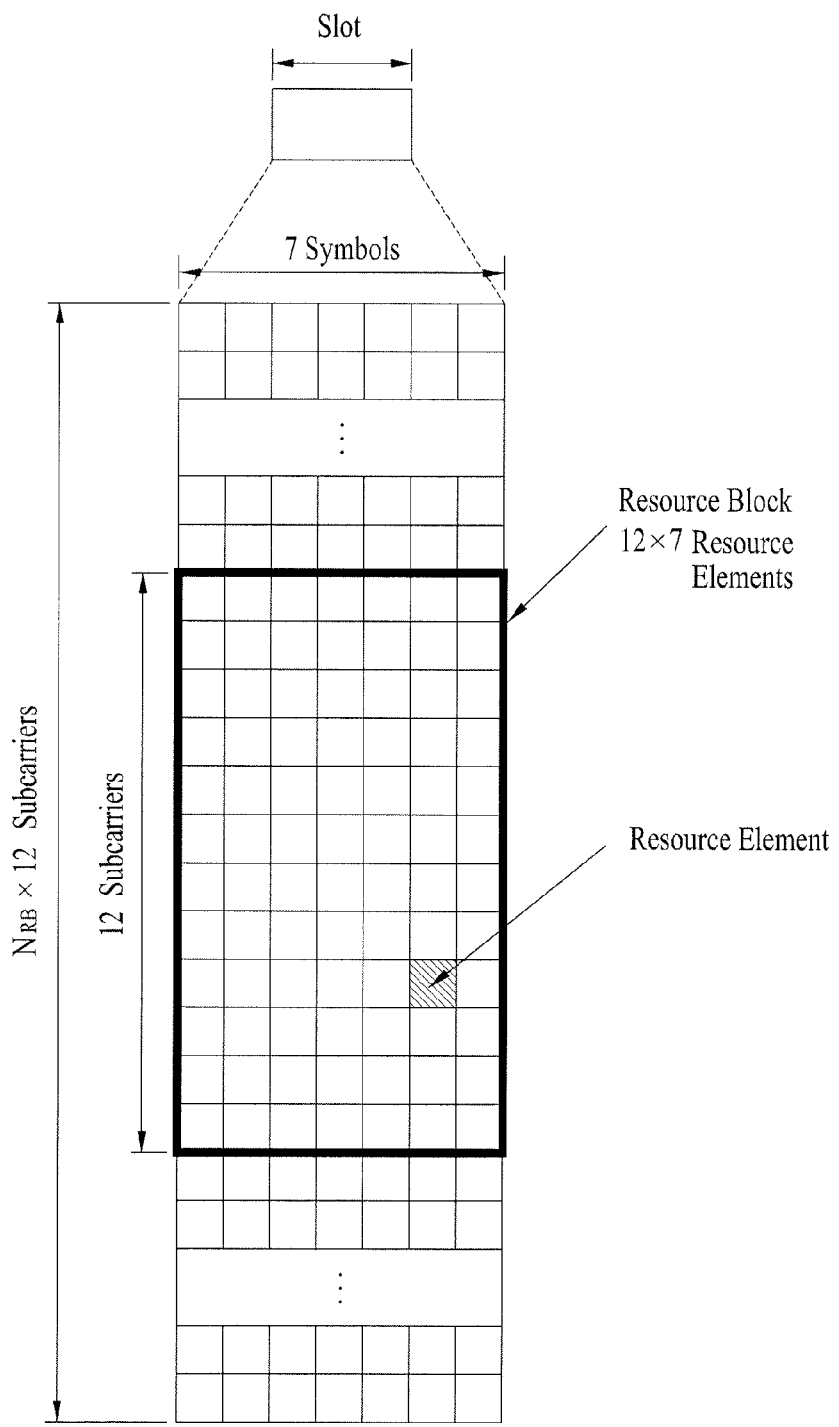
FIG. 2 illustrates a resource grid of a downlink slot

FIG. 2 illustrates a resource grid of a downlink slot.

Referring to FIG. 2, a downlink slot includes a plurality of OFDM symbols in the time domain. One downlink slot may include 7 (or 6) OFDM symbols and one resource block may include 12 subcarriers in a frequency domain. Each element on the resource grid is referred to as a resource element (RE). One RB includes 12×7 (6) REs. The number $N_{RB}$ of RBs included in a downlink slot depends on a downlink transmission band. An uplink slot has the same structure as the downlink slot and OFDM symbols are replaced with SC-FDMA symbols in the uplink slot.

Figure 3:
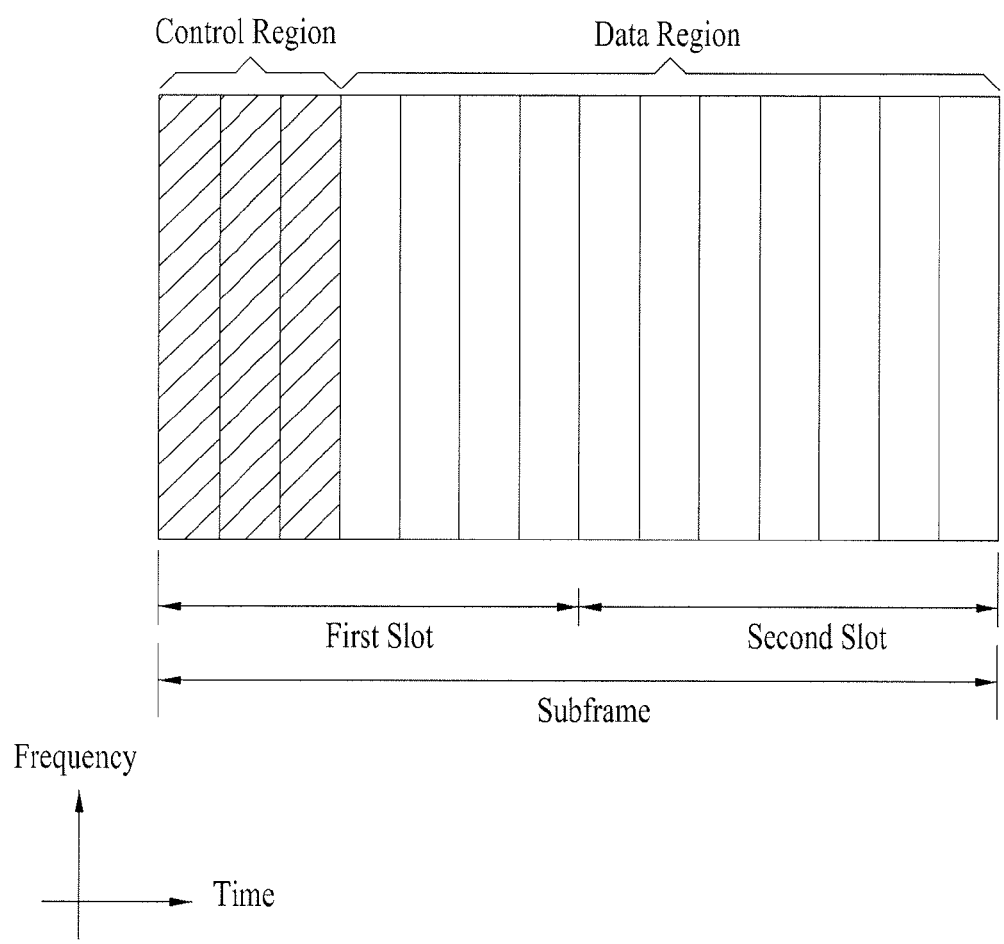
FIG. 3 illustrates a structure of a downlink subframe.

FIG. 3 illustrates a structure of a downlink subframe.

Referring to FIG. 3, a maximum of 3 (or 4) front OFDM symbols of the first slot in the subframe may correspond to a control region to which control channels are assigned. The other OFDM symbols may correspond to a data region to which a Physical Downlink Shared CHannel (PDSCH) is assigned. The PDSCH is used to carry a Transport Block (TB) or a CodeWord (CW) corresponding thereto. The transport block means a data block transmitted from a Medium Access Control (MAC) layer to a Physical (PHY) layer through a transport channel. The codeword corresponds to a coded version of the transport block. A relationship between the transport block and the codeword may be changed according to swapping. In this specification, the PDSCH, the transport block, the codeword, and the downlink data are used interchangeably. Examples of downlink control channels used in LTE(-A) include a Physical Control Format Indicator Channel (PCFICH), a Physical Downlink Control Channel (PDCCH), and a Physical Hybrid ARQ Indicator Channel (PHICH). The PCFICH is transmitted in the first OFDM symbol of a subframe, carrying information about the number of OFDM symbols used for transmission of control channels in the subframe. The PHICH carries a Hybrid Automatic Repeat reQuest Acknowledgment (HARQ-ACK) signal in response to uplink transmission. A HARQ-ACK response includes positive ACK (simply ACK), negative ACK (NACK), Discontinuous Transmission (DTX), or NACK/DTX. The HARQ-ACK is used interchangeably with HARQ ACK/NACK and ACK/NACK.

Control information transmitted via the PDCCH is referred to as Downlink Control Information (DCI). The DCI includes resource assignment information and other control information for a user equipment or a user equipment group. For example, the DCI includes uplink/downlink scheduling information and an uplink Transmit (Tx) Power Control Command. Transmission modes for configuring a multi-antenna technology and information content of DCI formats are listed as follows.

Transmission Modes (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user multiple input multiple output (MIMO)
Transmission mode 6: Closed-loop rank-1 precoding
Transmission mode 7: Transmission using UE-specific reference signals
DCI Formats
Format 0: Resource grant for PUSCH transmission (uplink)
Format 1: Resource assignment for signal codeword PDSCH transmission (transmission modes 1, 2, and 7)
Format 1A: Compact signaling of resource assignment for signal codeword PDSCH transmission (all modes)
Format 1B: Compact resource assignment for PDSCH (mode 6) using rank-1 closed loop precoding
Format 1C: Very compact resource assignment for PDSCH (for example, paging/broadcast system information)
Format 1D: Compact resource assignment for PDSCH (mode 5) using multi-user MIMO
Format 2: Resource assignment for PDSCH (mode 4) for closed loop MIMO operation
Format 2A: Resource assignment for PDSCH (mode 3) for open loop MIMO operation
Format 3/3A: Power control commands for PUCCH and PUSCH with a 2-bit/1-bit power adjustment value As previously described, the PDCCH carries a transmission format and resource assignment information of a Downlink Shared Channel (DL-SCH), a transmission format and resource assignment information of an Uplink Shared Channel (UL-SCH), paging information on a Paging Channel (PCH), system information on the DL-SCH, resource assignment information of an upper layer control message such as a random access response transmitted on the PDCCH, a Tx power control command set for individual user equipment in a user equipment group, Tx power control commands, and information indicating activation of Voice over IP (VoIP). A plurality of PDCCHs may be transmitted in the control region. A user equipment may monitor a plurality of PDCCHs. The PDCCH is transmitted on aggregation of one or more contiguous Control Channel Elements (CCEs). A CCE is a logical assignment unit used to provide coding rate based on a radio channel state to the PDCCH. CCEs correspond to a plurality of Resource Element Groups (REGs). A PDCCH format and the number of PDCCH bits are decided according to the number of CCEs. A base station decides the PDCCH format according to DCI to be transmitted to the user equipment and adds Cyclic Redundancy Check (CRC) to control information. The CRC is masked by an identifier (for example, Radio Network Temporary Identifier (RNTI)) according to the owner or use of the PDCCH. For example, in a case in which the PDCCH is for a specific user equipment, the CRC may be masked by an identifier (for example, cell-RNTI (C-RNTI)) of the user equipment. In a case in which the PDCCH is for a paging message, the CRC may be masked by a paging identifier (for example, paging-RNTI (P-RNTI)). In a case in which the PDCCH is for system information (more specifically, System Information Block (SIB)), the CRC may be masked by a system information RNTI (SI-RNTI). In a case in which the PDCCH is for a random access response, the CRC may be masked by a random access-RNTI (RA-RNTI).

Figure 4:
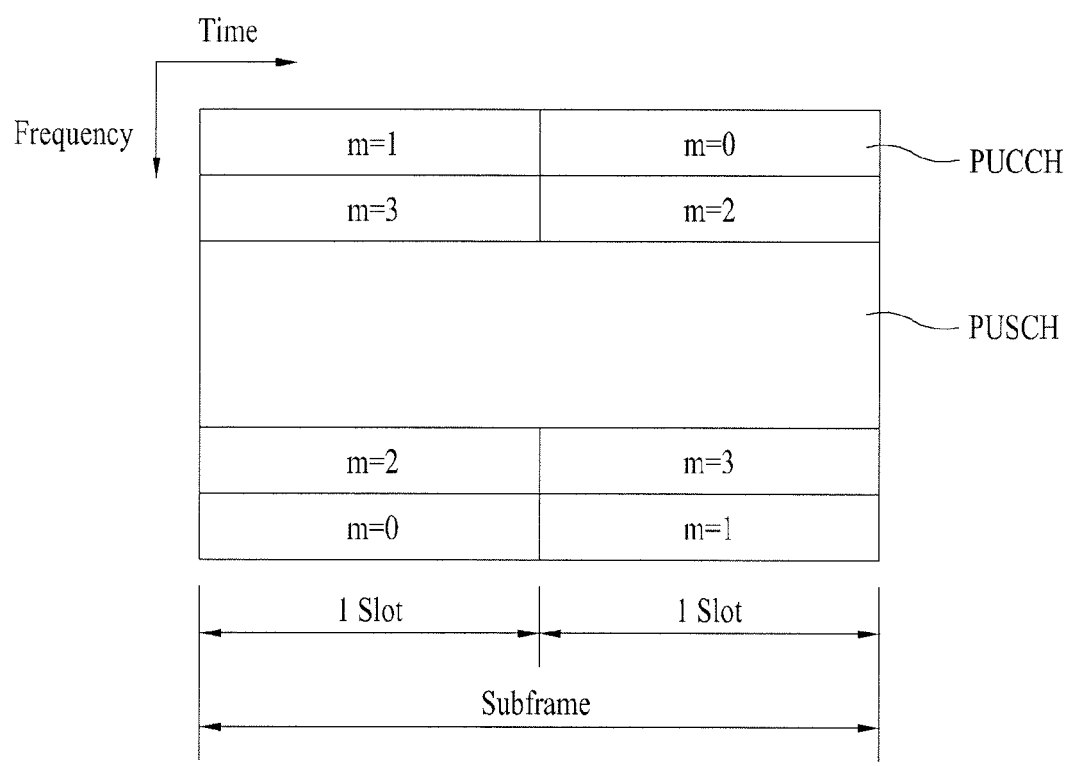
FIG. 4 illustrates a structure of an uplink subframe.

FIG. 4 illustrates a structure of an uplink subframe used in LTE.

Referring to FIG. 4, an uplink subframe includes a plurality of (for example, two) slots. A slot may include a different number of SC-FDMA symbols according to the length of a Cyclic Prefix (CP). In a frequency domain, the uplink subframe is divided into a data region and a control region. The data region includes a PUSCH and is used to transmit a data signal such as a voice. The control region includes a PUCCH and is used to transmit Uplink Control Information (UCI). The PUCCH includes an RB pair located at both ends of the data region on a frequency axis and the RB pair is hopped on a slot basis.

The PUCCH may be used to transmit the following control information.

Scheduling Request (SR): Information used to request an uplink UL-SCH resource. This is transmitted using an On-Off Keying (OOK) scheme.

HARQ-ACK: A response to a downlink data packet (for example, codeword) on the PDSCH. This indicates whether the downlink data packet has been successfully received. 1 bit of HARQ-ACK is transmitted in response to a single downlink codeword and 2 bits of HARQ-ACK are transmitted in response to two downlink codewords. A HARQ-ACK response includes positive ACK (simply ACK), negative ACK (NACK), Discontinuous Transmission (DTX), or NACK/DTX. The HARQ-ACK is used interchangeably with HARQ ACK/NACK and ACK/NACK.

Channel State Information (CSI): Feedback information for a downlink channel. Multiple Input Multiple Output (MIMO)-related feedback information includes a Rank Indicator (RI) and a Precoding Matrix Indicator (PMI). 20 bits are used per subframe.

The amount of control information (UCI) that the user equipment can transmit to the subframe depends upon the number of SC-FDMAs available for transmission of the control information. The SC-FDMAs available for transmission of the control information mean the remaining SC-FDMA symbols excluding an SC-FDMA symbol for transmission of a reference signal in the subframe. For a subframe in which a Sounding Reference Signal (SRS) is set, the last SC-FDMA symbol of the subframe is also excluded. The reference signal is used for coherent detection of the PUCCH. The PUCCH supports various formats according to information to be transmitted.

Table 3 indicates a mapping relationship between a PUCCH format and UCI in LTE(-A).

TABLE 3

| PUCCH format | Uplink Control Information (UCI) |
| --- | --- |
| Format 1 | Scheduling Request (SR) (non-modulated waveform) |
| Format 1a | 1-bit HARQ ACK/NACK (SR presence/absence) |
| Format 1b | 2-bit HARQ ACK/NACK (SR presence/absence) |
| Format 2 | CSI (20 coded bits) |
| Format 2 | CSI and 1- or 2-bit HARQ ACK/NACK (20 bits) (only for extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | A maximum of 24 bit HARQ ACK/NACK + SR (48 bits) |

Next, an ACK/NACK transmission process in a TDD system will be described. In a TDD scheme, the same frequency band is divided into DL subframes and UL subframes in the time domain (see FIG. 1). In a DL/UL asymmetric data traffic situation, therefore, a relatively large number of DL subframes may be assigned or a relatively large number of UL subframes may be assigned. In the TDD scheme, therefore, the DL subframes and the UL subframes may not correspond to each other in a one-to-one fashion. Particularly, in a case in which the number of DL subframes is greater than the number of UL subframes, the user equipment may transmit an ACK/NACK response to a plurality of PDSCHs (and/or PDCCHs requiring the ACK/NACK response) on a plurality of DL subframes in one UL subframe. For example, the DL subframes and the UL subframes may be set such that DL subframes:UL subframes=M:1 according to a TDD configuration. Where M is the number of DL subframes corresponding to one UL subframe. In this case, the user equipment must transmit an ACK/NACK response to a plurality of PDSCHs (and/or PDCCHs requiring the ACK/NACK response) on M DL subframes in one UL subframe.

Hereinafter, TDD signal transmission timing in a single carrier (or cell) situation will be described with reference to FIGS. 5 to 11.

Figure 5:
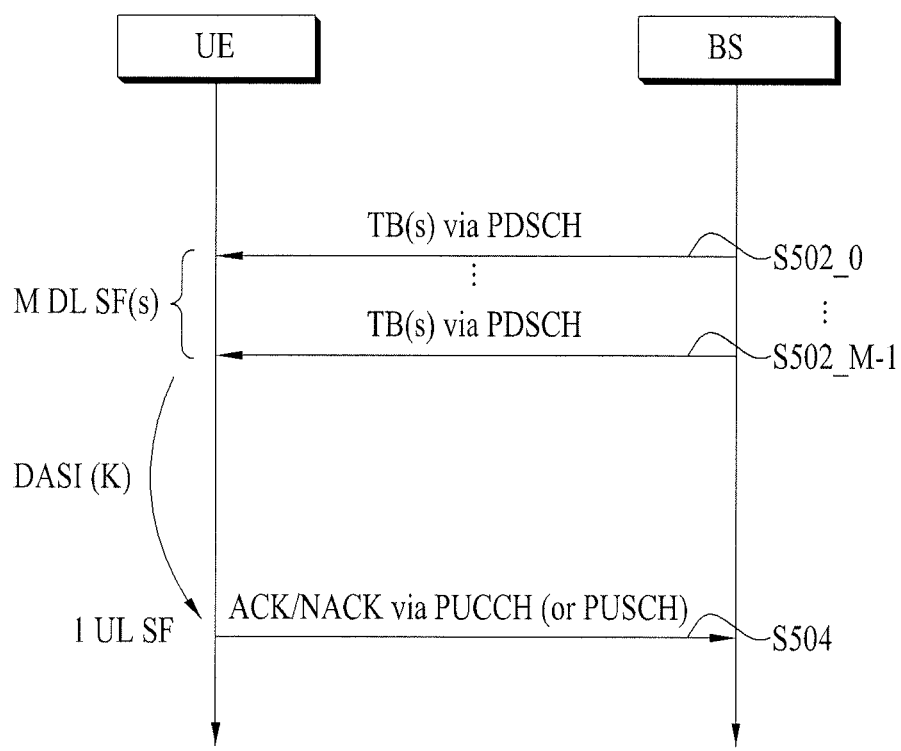
FIGS. 5 and 6 illustrate Time Division Duplex Uplink Acknowledgement/Negative Acknowledgement (TDD UL ACK/NACK) transmission timing in a single cell situation.
Figure 6:
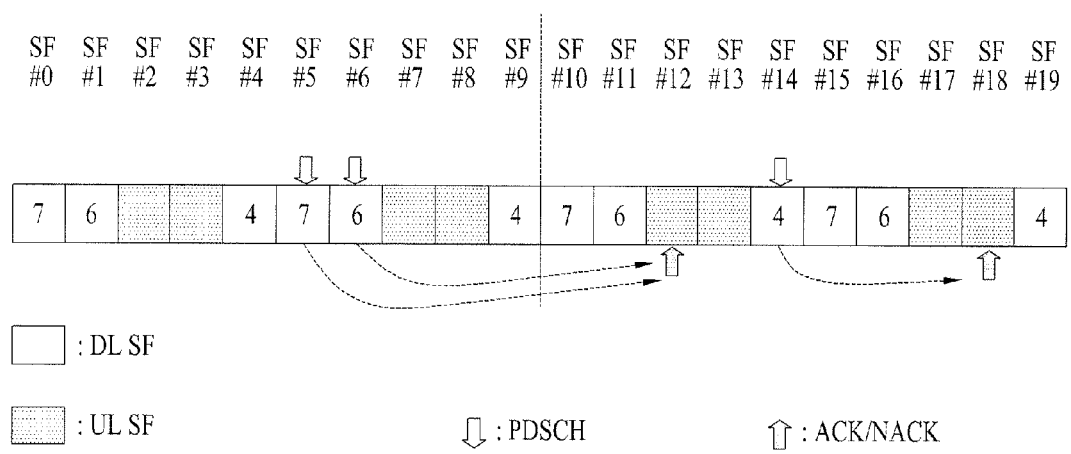

FIGS. 5 and 6 show PDSCH-UL ACK/NACK timing. UL ACK/NACK means ACK/NACK transmitted on an uplink in response to DL data (for example, PDSCH).

Referring to FIG. 5, the user equipment may receive one or more PDSCH signals on M DL subframes (SF) (S502_0 to S502_M-1). Each PDSCH signal is used to transmit one or more (for example, 2) transport blocks (TBs) according to a transmission mode. In addition, although not shown, at steps S502_0 to S502_M-1, a PDCCH signal indicating Semi-Persistent Scheduling (SPS) release may also be received. In a case in which the PDSCH signals and/or the SPS release PDCCH signal is present in the M DL subframes, the user equipment transmits ACK/NACK in one UL subframe corresponding to the M DL subframes through a process for transmitting ACK/NACK (for example, ACK/NACK (payload) generation, ACK/NACK resource assignment, etc.) (S504). The ACK/NACK includes reception response information for the PDSCH signals of steps S502_0 to S502_M-1 and/or the SPS release PDCCH signal. The ACK/NACK is basically transmitted via a PUCCH. In a case in which PUSCH transmission is present at the time of transmitting the ACK/NACK, however, the ACK/NACK is transmitted via a PUSCH. Various PUCCH formats indicated in Table 3 may be used for ACK/NACK transmission. In addition, various methods, such as ACK/NACK bundling and ACK/NACK channel selection, may be used to reduce the number of ACK/NACK bits transmitted through the PUCCH formats.

As described above, the ACK/NACK for data received in the M DL subframes is transmitted in one UL subframe in the TDD (that is, M DL subframe(s):1 UL subframe). A relationship therebetween is given by a Downlink Association Set Index (DASI).

Table 4 indicates DASI(K:$\{k_0, k_1, \ldots k_{M-1}\}$) defined in LTE(-A). Table 4 indicates intervals between a UL subframe and DL subframes associated therewith from the viewpoint of the UL subframe transmitting ACK/NACK. Specifically, in a case in which a subframe n−k (k∈K) includes a PDCCH indicating PDSCH transmission and/or Semi-Persistent Scheduling (SPS) release, the user equipment transmits the ACK/NACK in a subframe n.

TABLE 4

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In a case in which the user equipment loses some of PDCCHs transmitted by the base station during several subframe intervals when the user equipment transmits an ACK/NACK signal to the base station in the TDD, the user equipment may not be aware of the fact that a PDSCH corresponding to the lost PDCCH have been transmitted to the user equipment. As a result, an error may occur during ACK/NACK generation.

In order to solve such an error, a Downlink Assignment Index (DAI) is included in the PDCCH in the TDD system. The DAI indicates an accumulative value (that is, a counted value) of PDCCH(s) corresponding to PDSCH(s) up to a current subframe and PDCCH(s) indicating DL SPS release in DL subframe(s) n−k (k ⊂ K). For example, in a case in which three DL subframes correspond to one UL subframe, a PDSCH scheduling a PDSCH is transmitted in a state in which indexes are sequentially given (that is, sequentially counted) to the PDSCH transmitted during three DL subframe intervals. The user equipment may know whether previous PDCCHs have been normally received based on DAI information included in the PDCCH. For the sake of convenience, a DAI included in a PDSCH-scheduling PDCCH and an SPS release PDCCH is referred to as a DL DAI, DAI-c (counter), or simply DAI.

In a case in which the last PDCCH is lost, however, the user equipment is not aware of the fact that the last PDCCH is lost since the DAI value of the PDCCH finally detected coincides with the number of the PDCCHs detected until then. Consequently, the user equipment is aware of that only two PDCCHs have been scheduled during the DL subframe intervals. In this case, the user equipment bundles only ACK/NACK corresponding to the first two PDCCHs with the result an error occurs during an ACK/NACK feedback process. In order to solve this problem, a PUSCH-scheduling PDCCH (that is, UL grant PDCCH) includes a DAI field. The DAI field included in the UL grant PDCCH may be referred to as a UL DAI field. The UL DAI field is a 2-bit field. The UL DAI field indicates information about the number of scheduled PDCCHs.

Table 5 indicates a value $V^{DL}_{DAI}$ indicated by a DL DAI field and a value $V^{UL}_{DAI}$ indicated by a UL DAI field defined in LTE(-A).

TABLE 5

| DAI MSB, LSB | $V_{DAI}^{UL}$ or $V_{DAI}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

Table 6 indicates UL DAI field detection timing. Specifically, in a case in which ACK/NACK is transmitted in a subframe n, a UL DAI field is detected in a subframe n−k'.

TABLE 6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

FIG. 6 illustrates UL ACK/NACK transmission timing in a case in which UL-DL configuration #1 is set. In the drawing, SF#0 to SF#9 and SF#10 to SF#19 correspond to radio frames. In the drawings, numbers in boxes indicate UL subframes associated with a DL subframe from the viewpoint of the DL subframe. For example, ACK/NACK for a PDSCH of SF#5 is transmitted in SF#5+7 (=SF#12) and ACK/NACK for a PDSCH of SF#6 is transmitted in SF#6+6 (=SF#12). Consequently, ACK/NACK for a DL signal of SF#5/SF#6 is transmitted in SF#12. Similarly, ACK/NACK for a PDSCH of SF#14 is transmitted in SF#14+4 (=SF#18).

Figure 7:
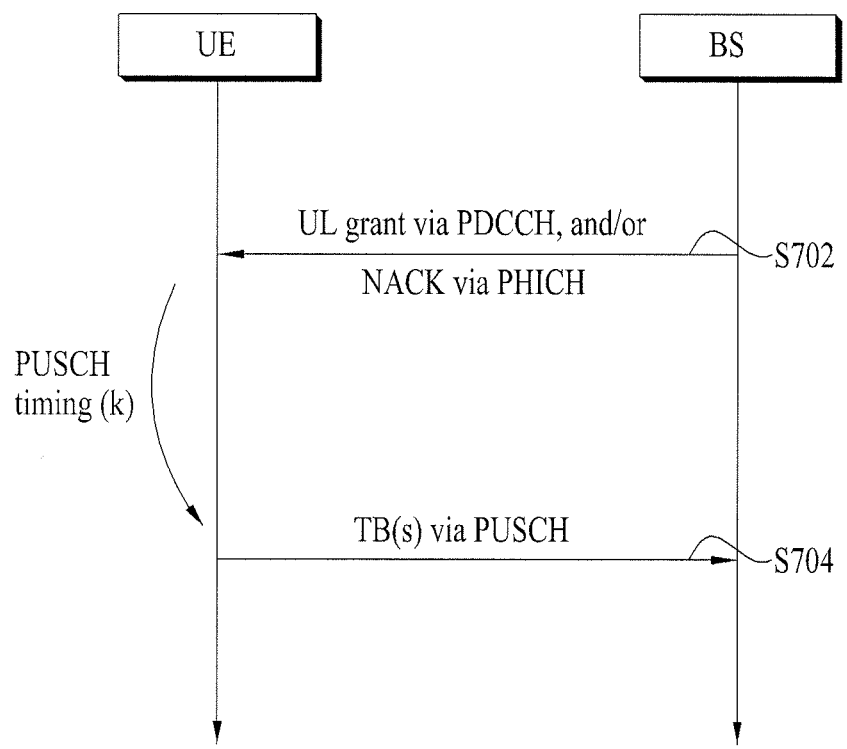
FIGS. 7 and 8 illustrate TDD Physical Uplink Shared CHannel (PUSCH) transmission timing in a single cell situation.
Figure 8:
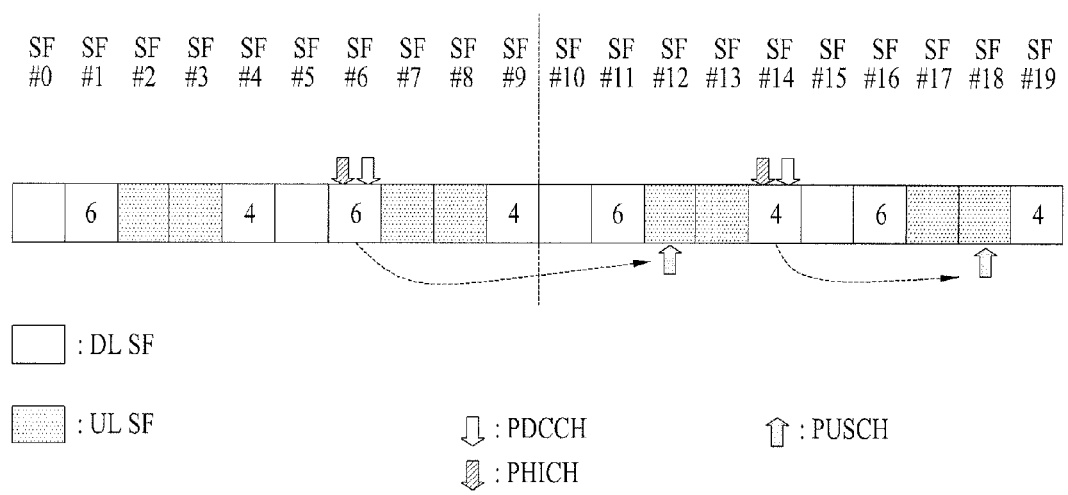

FIGS. 7 and 8 illustrate PHICH/UL grant-PUSCH timing. A PUSCH may be transmitted in response to a PDCCH (UL grant) and/or a PHICH (NACK).

Referring to FIG. 7, the user equipment may receive a PDCCH (UL grant) and/or a PHICH (NACK) (S720). NACK indicates an ACK/NACK response to previous PUSCH transmission. In this case, the user equipment may initially transmit/retransmit one or more transmit blocks (TBs) via a PUSCH after a subframe k through a PUSCH transmission process (for example, transmit block (TB) coding, transmit block (TB)-codeword (CW) swapping, PUSCH resource assignment, etc.) (S704). This example assumes a normal HARQ operation in which a PUSCH is transmitted once. In this case, PHICH/UL grants corresponding to PUSCH transmission are present in the same subframe. In case of subframe bundling in which the PUSCH is transmitted several times in a plurality of subframes, however, PHICH/UL grants corresponding to PUSCH transmission may be present in different subframes.

Table 7 indicates an Uplink Association Index (UAI) (k) for PUSCH transmission in LTE(-A). Table 7 indicates intervals between DL subframes and a UL subframe associated therewith from the viewpoint of the DL subframes in which PHICH/UL grants have been detected. Specifically, in a case in which a PHICH/UL grant is detected in a subframe n, the user equipment may transmit a PUSCH in a subframe n+k.

TABLE 7

| TDD UL/DL Configuration | \multicolumn{10}{c}{subframe number n} |||||||||| |
|---|---|---|---|---|---|---|---|---|---|---|
| | 0 | 1 | 2 | 3 | 4 | 5 | 6 | 7 | 8 | 9 |
| 0 | 4 | 6 |   |   | 4 | 6 |   |   |   |   |
| 1 |   | 6 |   |   | 4 |   | 6 |   |   | 4 |
| 2 |   |   | 4 |   |   |   |   | 4 |   |   |
| 3 | 4 |   |   |   |   |   |   | 4 | 4 |   |
| 4 |   |   |   |   |   |   |   | 4 | 4 |   |
| 5 |   |   |   |   |   |   |   | 4 |   |   |
| 6 | 7 | 7 |   |   |   | 7 | 7 |   |   | 5 |

Table 8 indicates timing (1) at which the user equipment detects a PHICH/UL grant in a case in which subframe bundling is performed in TDD UL-DL configurations #0, #1, and #6. Specifically, in a case in which a PHICH/UL grant is detected in a subframe n−1, the user equipment may transmit a PUSCH through bundling in a subframe n+k.

TABLE 8

| TDD UL/DL Configuration | \multicolumn{10}{c}{DL subframe number n} |||||||||| |
|---|---|---|---|---|---|---|---|---|---|---|
| | 0 | 1 | 2 | 3 | 4 | 5 | 6 | 7 | 8 | 9 |
| 0 | 9 | 6 |   |   |   | 9 | 6 |   |   |   |
| 1 |   | 2 |   | 3 |   |   | 2 |   |   | 3 |
| 6 | 5 | 5 |   |   |   | 6 | 6 |   |   | 8 |

FIG. 8 illustrates PUSCH transmission timing in a case in which UL-DL configuration #1 is set. In the drawing, SF#0 to #9 and SF#10 to #19 correspond to radio frames. In the drawings, numbers in boxes indicate UL subframes associated with a DL subframe from the viewpoint of the DL subframe. For example, a PUSCH for a PHICH/UL grant of SF#6 is transmitted in SF#6+6 (=SF#12) and a PUSCH for a PHICH/UL grant of SF#14 is transmitted in SF#14+4 (=SF#18).

Figure 9:
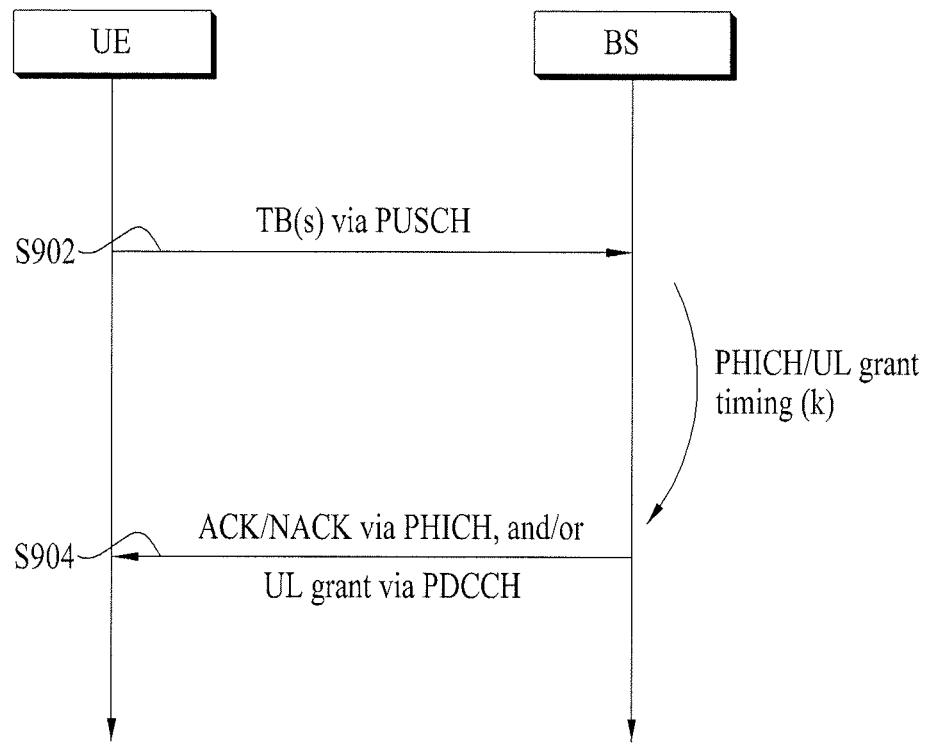
FIGS. 9 and 10 illustrate TDD DL ACK/NACK transmission timing in a single cell situation.
Figure 10:
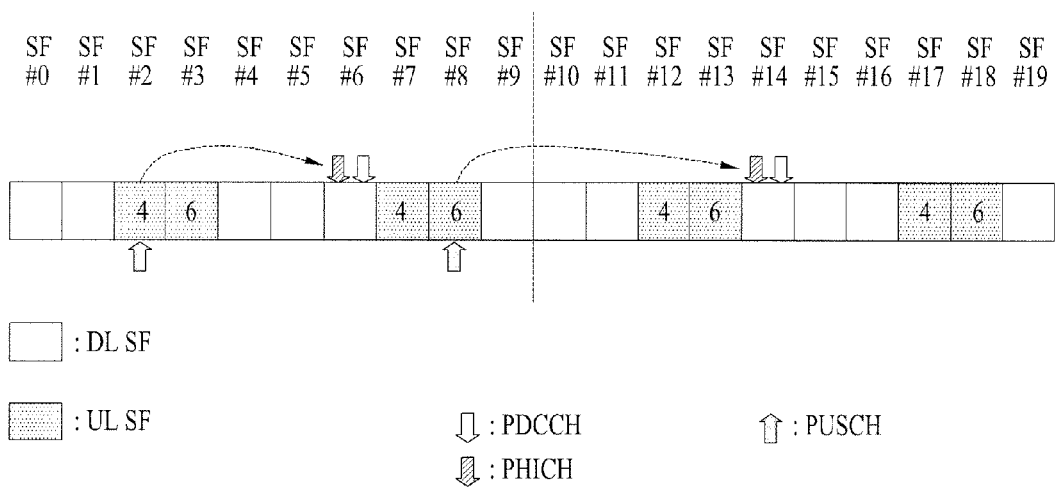

FIGS. 9 and 10 illustrate PUSCH-PHICH/UL grant timing. A PHICH is used to transmit DL ACK/NACK. DL ACK/NACK means ACK/NACK on a downlink in response to UL data (for example, PUSCH).

Referring to FIG. 9, the user equipment transmits a PUSCH signal to the base station (S902). The PUSCH signal is used to transmit one or more (for example, 2) transport blocks (TBs) according to a transmission mode. In response to PUSCH transmission, the base station may transmit ACK/NACK to the user equipment via a PHICH after a subframe k through a process for transmitting ACK/NACK (for example, ACK/NACK generation, ACK/NACK resource assignment, etc.) (S904). The ACK/NACK includes reception response information for the PUSCH signal of step S902. In addition, in a case in which a response to PUSCH transmission is NACK, the base station may transmit a UL grant PDCCH for PUSCH retransmission to the user equipment after a subframe k (S904). This example assumes a normal HARQ operation in which a PUSCH is transmitted once. In this case, PHICH/UL grants corresponding to PUSCH transmission are transmitted in the same subframe. In case of subframe bundling, however, PHICH/UL grants corresponding to PUSCH transmission may be transmitted in different subframes.

Table 9 indicates an Uplink Association Index (UAI)(k) for PHICH/UL grant transmission in LTE(-A). Table 9 indicates intervals between DL subframes and a UL subframe associated therewith from the viewpoint of the DL subframes in which PHICH/UL grants are present. Specifically, a PHICH/UL grant of a subframe i corresponds to PUSCH transmission of a subframe i−k.

TABLE 9

| TDD UL/DL Configuration | \multicolumn{10}{c}{subframe number i} |||||||||| |
|---|---|---|---|---|---|---|---|---|---|---|
| | 0 | 1 | 2 | 3 | 4 | 5 | 6 | 7 | 8 | 9 |
| 0 | 7 | 4 |   |   |   | 7 | 4 |   |   |   |
| 1 |   | 4 |   |   | 6 |   | 4 |   |   | 6 |
| 2 |   |   | 6 |   |   |   |   | 6 |   |   |
| 3 | 6 |   |   |   |   |   |   |   | 6 | 6 |
| 4 |   |   |   |   |   |   |   |   | 6 | 6 |
| 5 |   |   |   |   |   |   |   |   | 6 |   |
| 6 | 6 | 4 |   |   |   |   | 7 | 4 |   | 6 |

FIG. 10 illustrates PHICH/UL grant transmission timing in a case in which UL-DL configuration #1 is set. In the drawing, SF#0 to SF #9 and SF#10 to SF #19 correspond to radio frames. In the drawing, numbers in boxes indicate DL subframes associated with a UL subframe from the viewpoint of the UL subframe. For example, a PHICH/UL grant for a PUSCH of SF#2 is transmitted in SF#2+4 (=SF#6) and a PHICH/UL grant for a PUSCH of SF#8 is transmitted in SF#8+6 (=SF#14).

Next, PHICH resource assignment will be described. In a case in which PUSCH transmission is present in a subframe #n, the user equipment decides a corresponding PHICH resource in a subframe #(n+$k_{PHICH}$). In FDD, $k_{PHICH}$ has a fixed value (for example, 4). In TDD, $k_{PHICH}$ has a value changed according to UL-DL configuration. Table 10 indicates a value of $k_{PHICH}$ for TDD, which is equivalent to Table 9.

TABLE 10

| TDD UL/DL Configuration | \multicolumn{10}{c}{UL subframe index n} |||||||||| |
|---|---|---|---|---|---|---|---|---|---|---|
| | 0 | 1 | 2 | 3 | 4 | 5 | 6 | 7 | 8 | 9 |
| 0 |   |   | 4 | 7 | 6 |   |   | 4 | 7 | 6 |
| 1 |   |   | 4 | 6 |   |   |   | 4 | 6 |   |
| 2 |   |   | 6 |   |   |   |   | 6 |   |   |
| 3 |   |   | 6 | 6 | 6 |   |   |   |   |   |
| 4 |   |   | 6 | 6 |   |   |   |   |   |   |
| 5 |   |   | 6 |   |   |   |   |   |   |   |
| 6 |   |   | 4 | 6 | 6 |   |   | 4 | 7 |   |

PHICH resources are given by [PHICH group index, orthogonal sequence index]. The PHICH group index and the orthogonal sequence index are decided using (i) the smallest PRB index and (ii) a value of a 3-bit field for DeModulation Reference Signal (DMRS) cyclic shift. (i) and (ii) are indicated by a UL grant PDCCH.

Next, HARQ processes will be described. A plurality of parallel HARQ processes for UL transmission is present in the user equipment. In the parallel HARQ processes, UL transmission is successively performed while waiting for a HARQ feedback to successful or unsuccessful reception of previous UL transmission. Each HARQ process is associated with a HARQ buffer of a Medium Access Control (MAC) layer. Each HARQ process manages state variables related to the number of MAC Physical Data Block (PDU) transmissions in the buffer, a HARQ feedback to MAC PDUs in the buffer, a current redundancy version, etc.

In case of LTE(-A) FDD, the number of UL HARQ processes for a non-subframe bundling operation (that is, a normal HARQ operation) is 8. In case of LTE(-A) TDD, on the other hand, the number of UL HARQ processes is changed according to UL-DL configuration. In a case in which subframe bundling is applied, a bundle of PUSCH transmission including four successive UL subframes is transmitted in FDD and TDD. Consequently, a HARQ operation/process in a case in which subframe bundling is applied is different from the normal HARQ operation/process as described above.

Table 11 indicates the number of synchronous UL HARQ processes.

TABLE 11

| TDD UL/DL configuration | Number of HARQ processes for normal HARQ operation | Number of HARQ processes for subframe bundling operation |
| --- | --- | --- |
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

In a case in which TDD UL-DL configurations #1 to 6 are set and a normal HARQ operation is performed, when a UL grant PDCCH and/or PHICH is detected in a subframe n, the user equipment transmits a corresponding PUSCH signal in a subframe n+k (see Table 7) according to PDCCH and/or PHICH information.

In a case in which TDD UL-DL configuration #0 is set and a normal HARQ operation is performed, when a UL DCI grant PDCCH and/or PHICH is detected in a subframe n, PUSCH transmission timing at the user equipment is changed according to conditions. First, in a case in which a Most Significant Bit (MSB) of a UL index in DCI is 1 or a PHICH has been received through a resource corresponding to $I_{PHICH}=0$ in a subframe #0 or #5, the user equipment transmits a corresponding PUSCH signal in a subframe n+k (see Table 7). Next, in a case in which a Least Significant Bit (LSB) of a UL index in DCI is 1, a PHICH has been received through a resource corresponding to $I_{PHICH}=1$ in a subframe #0 or #5, or a PHICH has been received in a subframe #1 or #6, the user equipment transmits a corresponding PUSCH signal in a subframe n+7. Next, in a case in which both an MSB and an LSB in DCI are set, the user equipment transmits a corresponding PUSCH signal in a subframe n+k (see Table 7) or a subframe n+7.

Figure 11:
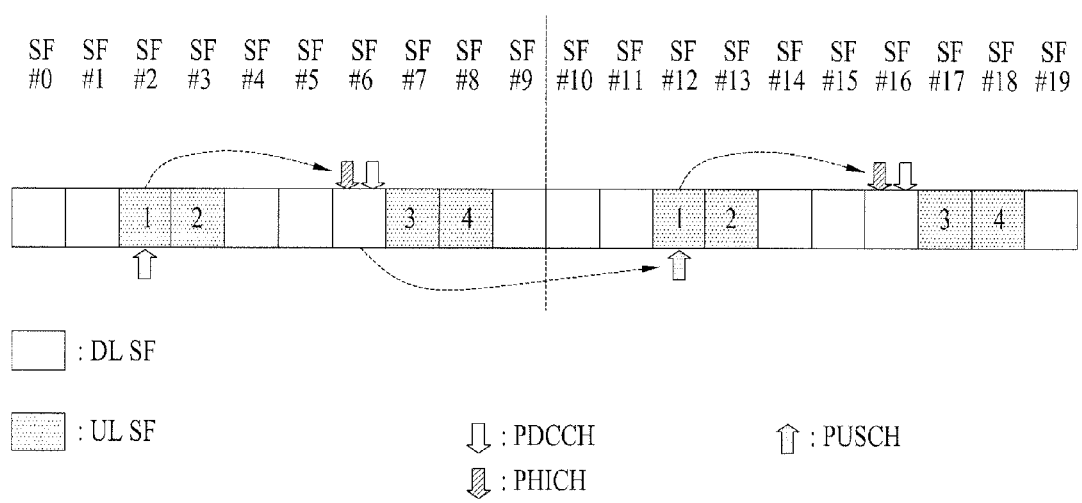
FIG. 11 illustrates TDD Hybrid Automatic Repeat reQuest (HARQ) processes in a single cell situation.

FIG. 11 illustrates synchronous UL HARQ processes in a case in which UL-DL configuration #1 is set. Numbers in boxes indicate UL HARQ process numbers. This example shows normal UL HARQ processes. Referring to FIG. 11, HARQ process #1 participates in SF#2, SF#6, SF#12, and SF#16. For example, in a case in which an initial PUSCH signal (for example, RV=0) has been transmitted in SF#2, a corresponding UL grant PDCCH and/or PHICH may be received in SF#6 and a corresponding (retransmission) PUSCH signal (for example, RV=2) may be received in SF#12. In case of UL-DL configuration #1, therefore, four UL HARQ processes, Round Trip Time (RTT) of which is 10 SFs (or 10 ms), are present.

Figure 12:
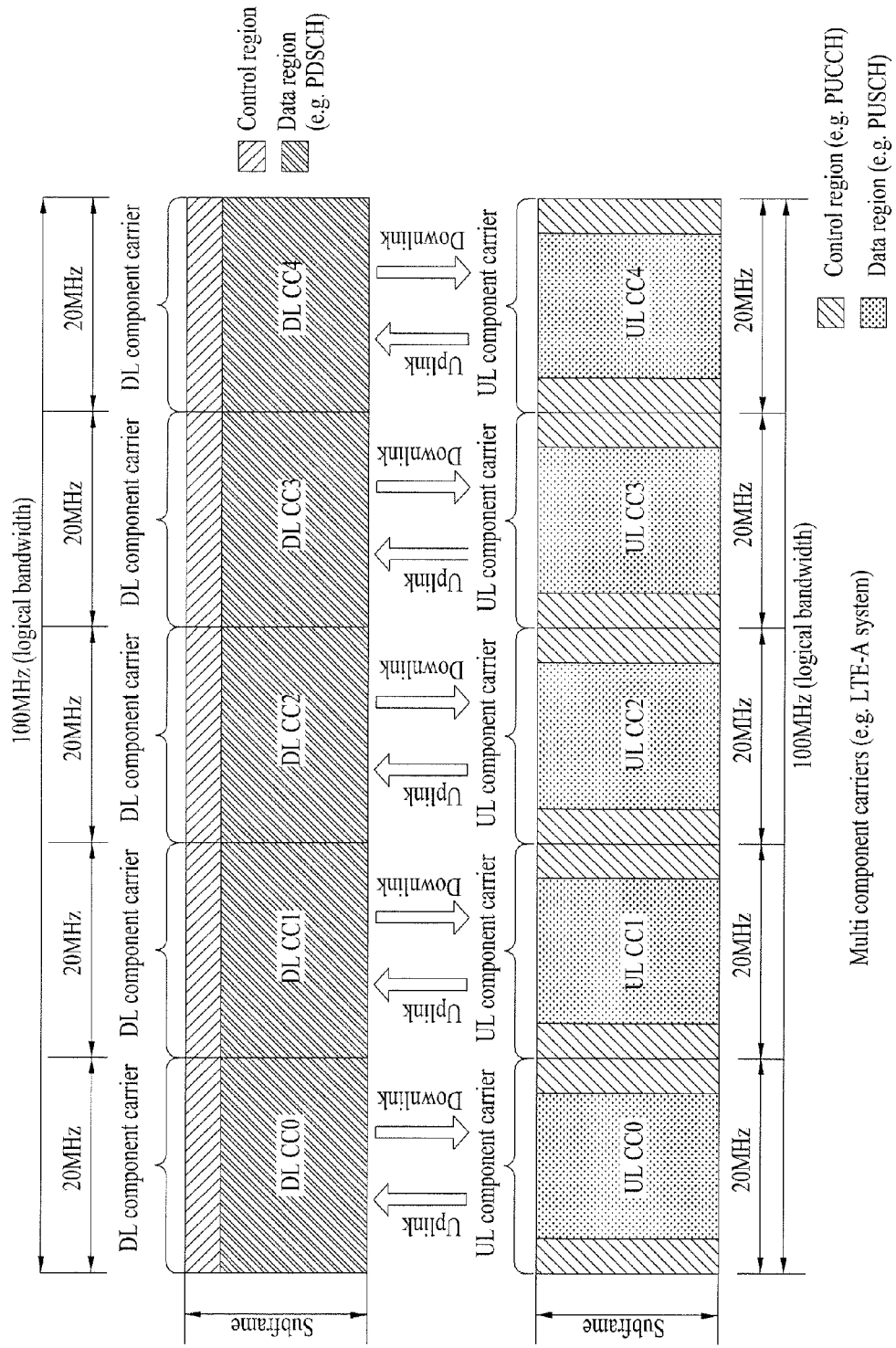
FIG. 12 illustrates a Carrier Aggregation (CA) communication system.

FIG. 12 illustrates a Carrier Aggregation (CA) communication system.

Referring to FIG. 12, a plurality of UL/DL Component Carriers (CCs) may be collected to support a wider UL/DL bandwidth. A technology for collecting and using a plurality of UL/DL Component Carriers as described above is called carrier aggregation or bandwidth aggregation. A component carrier may be understood as a carrier frequency (or center carrier or center frequency) for a corresponding frequency block. The respective CCs may be or may not be adjacent to each other in a frequency region. A bandwidth of each component carrier may be independently decided. Asymmetric carrier aggregation, in which the number of UL CCs is different from the number of DL CCs, may be possible. For example, in a case in which two DL CCs and one UL CC are provided, carrier aggregation may be configured to have a 2:1 correspondence. A DL CC/UL CC link may be fixed to a system or may be semi-statically configured. In addition, even in a case in which an overall system band includes N CCs, a frequency band that can be monitored/received by a specific user equipment may be limited to M (<N) CCs. Various parameters for carrier aggregation may be set based on a cell-specific, UE group-specific, or UE-specific scheme.

Meanwhile, control information may be set to be transmitted and received through a specific CC. Such a specific CC may be referred to as a Primary CC (PCC) and the other CCs may be referred to as Secondary CCs (SCCs). The PCC may be used for the user equipment to perform an initial connection establishment process or a connection reestablishment process. The PCC may be referred to as a cell indicated during a handover process. The SCCs may be configured after RRC connection establishment is achieved and may be used to provided additional radio resources. For example, scheduling information may be set to be transmitted and received through the specific CC. Such a scheduling scheme is called a cross-carrier scheduling (or cross-CC scheduling). In a case in which cross-CC scheduling is applied, a PDCCH for DL assignment may be transmitted in DL CC#0 and a corresponding PDSCH may be transmitted in DL CC#2. The term "component carrier" may be replaced with other equivalent terms such as a carrier and a cell.

A Carrier Indicator Field (CIF) is used for cross-CC scheduling. Setting for CIF presence or absence in a PDCCH may be semi-statically and UE-specifically (or UE group-specifically) enabled by an upper layer signal (for example, RRC signaling). Basic items of PDCCH transmission may be listed as follows.

CIF disabled: A PDCCH on a DL CC assigns a PDSCH resource on the same DL CC and a PUSCH resource on a single linked UL CC.

CIF absence

CIF enabled: A PDCCH on a DL CC may assign a PDSCH or PUSCH resource one DL/UL CC selected from among a plurality of aggregated DL/UL CCs using a CIF.

an LTE DCI format extended to have a CIF

A CIF (if set) is a fixed x-bit field (for example, x=3)

Location of a CIF (if set) is fixed irrespective of a DCI format size

In a case in which a CIF is present, the base station may assign a monitoring DL CC to reduce blind detection complexity at the user equipment side. The user equipment may perform PDCCH detection/decoding only in a corresponding DL CC for PDSCH/PUSCH scheduling. In addition, the base station may a PDCCH through a monitoring DL CC (set). The monitoring DL CC set may be set based on a UE-specific, UE group-specific, or cell-specific scheme.

Figure 13:
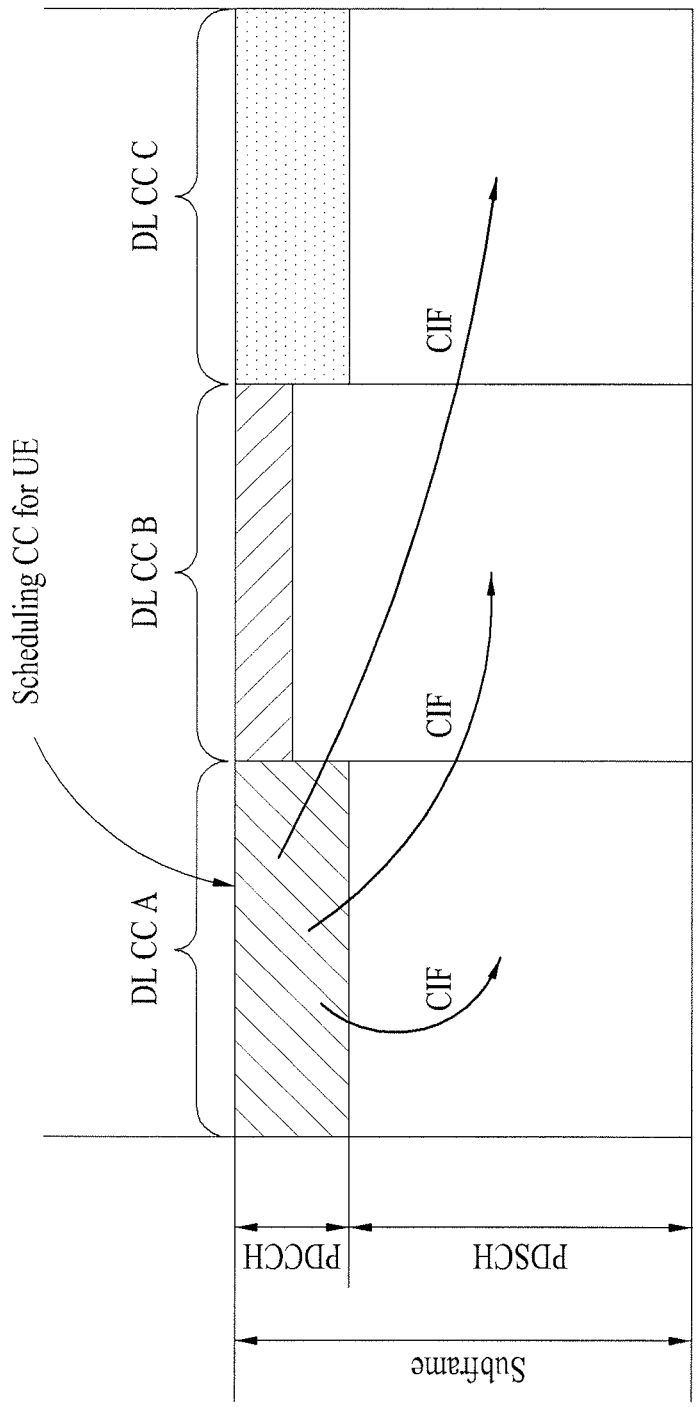
FIG. 13 illustrates scheduling in a case in which a plurality of carriers is aggregated.

FIG. 13 illustrates scheduling in a case in which a plurality of carriers is aggregated. It is assumed that three DL CCs are aggregated and DL CC A is set as a monitoring DL CC. DL CC A to DL CC C may be referred to as serving CCs, serving carriers, and serving cells. When the Carrier Indicator Field (CIF) is disabled, each DL CC may transmit only a PDCCH scheduling a PDSCH thereof without the CIF (non-cross-CC scheduling). On the other hand, when the CIF is enabled by UE-specific (or UE group-specific or cell-specific) upper layer signaling, a specific CC (for example, DL CC A) may transmit not only a PDCCH scheduling a PDSCH of DL CC A but also a PDCCH scheduling a PDSCH of another CC using the CIF (cross-CC scheduling). In DL CC B/C, however, no PDCCH is transmitted.

A specific CC (or cell) used to transmit scheduling information (for example, PDCCH) is called a monitoring CC (MCC), which may be replaced with equivalent terms such as a monitoring carrier, a monitoring cell, a scheduling carrier, a scheduling cell, and a scheduling CC. A DL CC in which a PDSCH corresponding to a PDCCH is transmitted and a UL CC in which a PUSCH corresponding to a PDCCH is transmitted may be referred to as scheduled carriers, scheduled CCs, or scheduled cells. One or more scheduling CCs may be set for one user equipment. A scheduling CC may include a PCC. In a case in which only one scheduling CC is set, the scheduling CC may be a PCC. The scheduling CC may be set based on a UE-specific, UE group-specific, or cell-specific scheme.

A scheme in which aggregation of a plurality of CCs (that is, carrier aggregation) is supported and ACK/NACK for DL data (for example, data transmitted via a PDSCH) transmitted through a plurality of CCs is transmitted through only a specific CC (for example, PCC) may be considered in LTE-A. As previously described, CCs other than the PCC may be referred to as SCCs. In addition, cross-CC scheduling may be supported during carrier aggregation in LTE-A. In this case, one CC (for example, one scheduled CC) may be preset to be DL/UL scheduled through one specific CC (for example, scheduling CC). For example, the scheduled CC may be set to receive a DL/UL grant PDCCH through the scheduling CC. Basically, the scheduling CC may perform DL/UL scheduling of the scheduling CC. ACK/NACK for UL data (for example, data transmitted via a PUSCH) transmitted through the scheduling/scheduled CC may be transmitted through the scheduling CC (for example, a PHICH of the scheduling CC). For the sake of convenience, the scheduling CC may be referred to as a monitoring CC (MCC), the scheduled CC may be referred to as a secondary CC (SCC), and the ACK/NACK for UL data may be referred to as a PHICH.

Meanwhile, aggregation of a plurality of CCs operating in different UL-DL configurations may be considered in a TDD-based beyond LTE-A system. In this case, ACK/NACK timing set for a UL-DL configuration of the PCC may be different from ACK/NACK timing set for a UL-DL configuration of the SCC. In other words, UL subframe timing in which ACK/NACK for DL data transmitted in respective DL subframes is transmitted may vary. For example, UL subframe timing in which ACK/NACK for DL data transmitted in the same DL subframe timing is transmitted may be set to vary between the PCC and the SCC. Similarly, a DL subframe group, to which an ACK/NACK feedback transmitted in the same UL subframe timing is provided, may be set to vary between the PCC and the SCC. In addition, a PCC and SCC link direction (i.e. DL or UL) may be set to vary in the same subframe timing. For example, the SCC may be set as a UL subframe (in which ACK/NACK will be transmitted) in a specific subframe timing, whereas the PCC may be set as a DL subframe in the specific subframe timing.

In addition, even in case of carrier aggregation based on different UL-DL configurations, cross-CC scheduling may be supported. In this case, UL grant and PHICH timing set for an MCC may be different from UL grant and PHICH timing set for an SCC. In other words, DL subframe timing in which a UL grant scheduling UL data to be transmitted in respective UL subframes is transmitted and a PHICH for corresponding UL Data is transmitted may vary between the MCC and the SCC. For example, DL subframe timing in which a UL grant/PHICH for UL data transmitted in the same UL subframe timing is transmitted may be set to vary between the MCC and the SCC. Similarly, a UL subframe group, to which a UL grant/PHICH feedback transmitted in the same DL subframe timing is provided, may be set to vary between the MCC and the SCC. For example, the SCC may be set as a DL subframe in which a UL grant/PHICH is transmitted in a specific subframe timing, whereas the MCC may be set as a UL subframe in the corresponding subframe timing.

Figure 14:
FIG. 14 illustrates half-duplex type TDD-based carrier aggregation.

FIG. 14 illustrates half-duplex type TDD-based carrier aggregation. For the convenience of description, a description will focus on a PCC. However, the PCC may be generically referred to as a PCC or an MCC.

Referring to FIG. 14, in case of TDD-based carrier aggregation, a scheme in which only CCs having a specific link direction or the same link direction as a specific CC (for example, PCC or MCC) are used in subframe timing in which PCC (or MCC) and SCC link directions are different from each other according to a hardware configuration or other reason/purpose of the user equipment may be considered. This scheme is referred to as a half-duplex operation scheme. In addition, in case of TDD-based carrier aggregation, subframes having different link directions of corresponding CCs in specific subframe timing are referred to as collided subframes. For example, in specific subframe timing, a PCC may be set as a DL subframe and an SCC may be set as a UL subframe to form collided subframes. In collided subframe timing, only a PCC (that is, a DL subframe set in the PCC), which is a CC having a DL direction, may be used and an SCC (that is, a UL subframe set in the SCC), which is a CC having a UL direction, may not be used (Of course, an opposite case may be also possible). FIG. 14 illustrates an example of a half-duplex operation-based TDD carrier aggregation structure. In the drawing, subframes denoted by "X" indicate subframes (or link directions) of CCs which are restricted for use as collided subframes. In addition, subframes of CCs restricted for use as collided subframes may be referred to as "X" subframes.

Hereinafter, a scheme for setting and using UL and DL HARQ timing (that is, ACK/NACK timing and UL grant or PHICH timing) for supporting a half-duplex operation in a case in which CCs having different TDD UL-DL configurations are aggregated according to embodiments of the present invention will be proposed. For the convenience of description, it is assumed that, in a case in which ACK/NACK timing is set, one PCC and one SCC having different UL-DL configurations are carrier aggregated. In addition, it is assumed that, in a case in which UL grant or PHICH timing is set, one MCC and one SCC having different UL-DL configurations are carrier aggregated. However, methods according to embodiments of the present invention may be applied even to a case in which a PCC or a MCC and a plurality of SCCs having different UL-DL configurations are aggregated. For example, in a case in which a plurality of SCCs having different UL-DL configurations has different UL-DL configurations than a PCC, methods according to embodiments of the present invention may be individually applied to setting of ACK/NACK timing for the SCCs and the PCC. In addition, in a case in which a plurality of SCCs having different UL-DL configurations has different UL-DL configurations than an MCC, methods according to embodiments of the present invention may be individually applied to setting of UL grant or PHICH timing for the SCCs and the MCC.

In the following description, "D" indicates a DL subframe or a special subframe, "U" indicates a UL subframe, and "X" indicates a subframe of a specific CC restricted for use in collided subframe timing. A UL-DL configuration may be decided according to Table 1 above. Meanwhile, ACK/NACK timing may mean UL subframe timing set to transmit ACK/NACK for DL data received in a specific DL subframe or a special subframe from the viewpoint of the user equipment. UL grant or PHICH timing may mean DL subframe timing set to receive a UL grant (for example, a UL grant PDCCH) scheduling UL data (for example, PUSCH) transmitted in a specific UL subframe or to receive ACK/NACK (for example, PHICH) for UL data (for example, PUSCH) transmitted in a specific UL subframe from the viewpoint of the user equipment. For the sake of convenience, the UL grant or PHICH timing may be referred to as UL grant/PHICH timing. The ACK/NACK timing may be set in a specific CC or a specific UL-DL configuration through application of parameter values indicated in Table 4 and Table 6. In addition, the UL grant/PHICH timing may be set in a specific CC or a specific UL-DL configuration through application of parameter values indicated in Table 7 to Table 10. Based thereupon, ACK/NACK timing for DL data transmitted through a PCC/SCC and UL grant/PHICH timing for UL data transmission in an MCC/SCC during cross-CC scheduling may be set according to the following embodiments.

Embodiment 1—Common ACK/NACK Timing

A scheme of selecting a UL-DL configuration configured as D in all subframe timings configured to D or X on PCC are selected and applying ACK/NACK timing according to the selected UL-DL configuration may be considered. This scheme may be referred to as common ACK/NACK timing. For example, a UL-DL configuration having the smallest number of D may be selected from among UL-DL configurations configured as D in all subframe timings configured to D or X on PCC. The common ACK/NACK timing scheme may have the following properties.

D/U of the selected UL-DL configuration are configured such that ACK/NACK timing for a subframe in which PCC and/or SCC correspond to D, i.e. a subframe satisfying (PCC, SCC)=(D, D) or (D, X) or (X, D), is configured in U of PCC.

In case of a subframe timing satisfying (PCC, SCC)=(X, U), transmission and reception on PCC are restricted and, therefore, a corresponding subframe cannot be configured to D. In case of the selected UL-DL configuration, a corresponding subframe is regarded as being configured to D such that ACK/NACK timing cannot be configured in the corresponding subframe.

In the selected UL-DL configuration, it is possible to configure and apply ACK/NACK timing only for D having a subframe timing coinciding with D of PCC and/or SCC. That is, a detection/reception operation may be performed only for a DL grant PDCCH scheduling a corresponding D and/or DL data transmitted in the corresponding D, and ACK/NACK information/bits and ACK/NACK timing only for the corresponding D may be configured.

In a case in which the common ACK/NACK timing scheme (or another ACK/NACK timing scheme) is applied to configure ACK/NACK timing, bits/number of ACK/NACK to be transmitted may be differently configured per U of PCC. In this case, for efficient use of ACK/NACK transmission resources, different PUCCH formats and/or different transmission schemes may be used for ACK/NACK transmitted in each U of PCC. For example, an available PUCCH format may be PUCCH format 3 or PUCCH format 1a/1b. In addition, an available transmission scheme may be multi-bit ACK/NACK coding or ACK/NACK selection. In a preferred example, ACK/NACK timing may be configured such that ACK/NACK for both PCC and an SCC is simultaneously transmitted in a specific U (PCC-U1) of PCC, whereas ACK/NACK timing may be set such that only ACK/NACK for PCC is simultaneously transmitted in another specific U (PCC-U2) of the PCC. In this case, different PUCCH resources and/or different transmission schemes may be applied to ACK/NACK transmitted in PCC-U1 and PCC-U2. For example, a multi-bit ACK/NACK coding scheme using an explicit PUCCH resource (for example, PUCCH format 3) may be applied to ACK/NACK transmitted in PCC-U1, and an ACK/NACK selection scheme using an implicit PUCCH resource (for example, PUCCH format 1 a/1b) may be applied to ACK/NACK transmitted in PCC-U2.

FIG. 15 illustrates ACK/NACK timing according to an embodiment of the present invention.

In FIG. 15, it is assumed that a PCC and an MCC are the same CC for the convenience of description. Accordingly, a description will be given on the assumption that a PCC and an SCC are carrier aggregated. However, the PCC and the MCC may be different from each other. In one example of the present invention, ACK/NACK timing may be applied based on the PCC. In another example of the present invention, on the other hand, ACK/NACK timing may be applied based on the MCC. For the convenience of description, a description will hereinafter be given based on the PCC. In addition, it is assumed that a half-duplex operation scheme is applied.

Referring to FIG. 15(a), a PCC is configured to have UL-DL configuration #2 and an SCC is configured to have UL-DL configuration #4. As shown, the PCC and the SCC have different subframe directions in SF#3 and SF#7. In the other subframes, the PCC and the SCC have the same subframe directions. In SF#2, both the PCC and the SCC are configured as U. In this example, therefore, collided subframes may occur in SF#3 and SF#7 when a half-duplex operation scheme is applied.

Referring to FIG. 15(b), in this example, a collided subframe configuration may be such that only U of the SCC and only D of the SCC are used in SF#3 and SF#7, respectively, in which the collided subframes occur. Consequently, SF#3 of the PCC may be configured to X and SF#7 of the PCC may also be configured to X. On the other hand, SF#3 of the SCC may be configured and used as U as originally configured. In addition, SF#7 of the SCC may also be configured and used as D as originally configured.

Referring to FIG. 15(c), there is illustrated a UL-DL configuration selected in a case in which a common ACK/NACK timing scheme according to an embodiment of the present invention is applied. According to the common ACK/NACK timing scheme, a UL-DL configuration in which D is set for SF#0, #1, #3, #4, #5, #6, #7, #8, and #9 set to D or X for a PCC is selected. In Table 1, only UL-DL configuration #5 corresponds to the above configuration and, therefore, ACK/NACK timing may be set according to UL-DL configuration #5. In a case in which several corresponding UL-DL configurations are present, a UL-DL configuration having the smallest number of D may be selected and ACK/NACK timing configured thereto may be applied. Only ACK/NACK timing for D having subframe timing coinciding with D of a PCC and/or an SCC may be extracted from the selected UL-DL configuration and may be applied.

FIG. 16 illustrates ACK/NACK timing according to an embodiment of the present invention.

The same assumption and condition as FIG. 15 are applied to FIG. 16. FIG. 16 is different from FIG. 15 in terms of how to operate in collided subframes. That is, in FIG. 16(b), a collided subframe configuration is such that only U of an SCC and only U of a PCC are respectively used in the collided subframes SF#3 and SF#7, when applying a half-duplex operation scheme.

Referring to FIG. 16(b), only U of the SCC and only U of the PCC are respectively used in SF#3 and SF#7 in which the collided subframes occur. Consequently, SF#3 of the PCC may be configured to X and SF#7 of the SCC may be configured to X. On the other hand, SF#3 of the SCC may be configured and used as U as originally configured. In addition, SF#7 of the PCC may also configured and used as U as originally configured.

Referring to FIG. 16(c), there is illustrated a UL-DL configuration selected in a case in which a common ACK/NACK timing scheme according to an embodiment of the present invention is applied. According to the common ACK/NACK timing scheme, a UL-DL configuration in which D is set for SF#0, #1, #3, #4, #5, #6, #8, and #9 set to D or X for a PCC is selected. For example, in Table 1, UL-DL configurations #2 and #5 correspond to the above configuration. A UL-DL configuration having the smallest number of D may be selected from between the two UL-DL configurations. For example, since the number of D in UL-DL configuration #2 is 6 and the number of D in UL-DL configuration #5 is 8, UL-DL configuration #2 may be selected. Consequently, only ACK/NACK timing for D having subframe timing coinciding with D of a PCC and/or an SCC may be extracted from the selected UL-DL configuration and may be applied.

Embodiment 2—Common UL Grant/PHICH Timing

A description will be given of a method of deciding UL grant or PHICH timing for an MCC/SCC in a case in which cross-CC scheduling is configured in a system which operates based on a half-duplex scheme and in which different CCs are aggregated. A scheme of selecting a UL-DL configuration configured as D in all subframe timings configured to U or X on MCC are selected and applying UL grant or PHICH timing according to the selected UL-DL configuration may be considered. This scheme may be referred to as a common UL grant/PHICH timing. For example, a UL-DL configuration having the smallest number of U may be selected from among UL-DL configurations configured as U in all subframe timings configured to U or X on MCC. It should be noted that this scheme may be applied based on PCC instead of MCC. The UL-DL configuration selected according to the common UL grant/PHICH timing scheme may have the following properties.
  D/U of the selected UL-DL configuration are configured such that UL grant/PHICH timing for a subframe in which an MCC and/or SCC correspond to U, i.e. a subframe satisfying (MCC, SCC)=(U, U) or (U, X) or (X, U), is configured in D of MCC.
  In case of a subframe timing satisfying (MCC, SCC)=(X, D), transmission and reception on MCC are restricted and, therefore, corresponding subframe timing cannot be set to UL grant/PHICH timing in the selected UL-DL configuration. In case of the selected UL-DL configuration, a corresponding subframe is regarded as being configured to U such that UL grant/PHICH timing cannot be configured in the corresponding subframe.
  In the selected UL-DL configuration, it is possible to configure and apply UL grant/PHICH timing only for U having a subframe timing coinciding with U of MCC and/or SCC.

The common UL grant/PHICH timing scheme may be applied in a case in which the cross-CC scheduling is configured. However, the present invention is not limited thereto. For example, the common UL grant/PHICH timing scheme may be applied in a case in which the cross-CC scheduling is not configured.

In a case in which the common UL grant/PHICH timing scheme (or another UL grant/PHICH timing scheme) is applied, a specific D (MCC-D1) of MCC which is not configured to receive a UL grant or PHICH may be configured as UL grant or PHICH timing for PUSCH transmission in a specific U of MCC/SCC from the viewpoint of the user equipment when the MCC operates alone. In this case, since the original MCC-D1 is not configured to receive a UL grant or PHICH, it is not possible for the user equipment to perform a PHICH-based HARQ process. Consequently, U (or all Us set in CCs including corresponding U) of MCC/SCC in which UL grant or PHICH timing is configured in MCC-D1 may be used for one-time UL data transmission depending only upon an instantaneous UL grant irrespective of a PHICH-based HARQ operation. This may be considered as a scheme in which a HARQ operation is continuously performed but retransmission is performed depending only upon whether a UL grant has been detected/received without execution of a PHICH detection/reception operation and non-adaptive automatic retransmission based thereon. For example, a PUSCH or UCI information (for example, ACK/NACK and/or CQI/PMI/RI, etc.) may be transmitted only in a case in which the user equipment receives a UL grant in MCC-D1. Alternatively, a scheme in which PUSCH scheduling/transmission is restricted for U (or all Us set in CCs including corresponding U) of an MCC/SCC set in MCC-D1 and the U is used for another use may be considered. For example, only PUCCH and/or SRS and/or PRACH transmission may be allowed in the corresponding U.

FIG. 17 illustrates a UL grant/PHICH timing scheme for UL data transmission during cross-CC scheduling according to an embodiment of the present invention. In the same manner as in FIG. 15, it is assumed that a PCC and an MCC are the same and a half-duplex operation scheme is applied. However, the PCC and the MCC may be different from each other. In this example, UL grant/PHICH timing may be applied based on the PCC. In another example, on the other hand, UL grant/PHICH timing may be applied based on the MCC. A PCC is set to UL-DL configuration #2 and an SCC is set to UL-DL configuration #4. It is set that only U of the SCC and D of the SCC are used in collided subframes. A description of FIGS. 17(a) and 17(b) will be replaced with that of FIGS. 15(a) and 15(b).

Referring to FIG. 17(c), there is illustrated a UL-DL configuration selected in a case in which a common UL grant/PHICH timing scheme according to an embodiment of the present invention is applied. A UL-DL configuration in which U is set for SF#2, #3, and #7 set to U or X for a PCC is selected. For example, in Table 1, UL-DL configurations #0, #1, and #6 correspond to the above configuration and a UL-DL configuration having the smallest number of U may be selected from among the three UL-DL configurations. For example, since the number of U in UL-DL configuration #0 is 6, the number of U in UL-DL configuration #1 is 4, and the number of U in UL-DL configuration #6 is 5, UL-DL configuration #1 may be selected. Consequently, UL grant/PHICH timing set according to UL-DL configuration #1 may be applied.

FIG. 18 illustrates a UL grant/PHICH timing scheme for UL data transmission during cross-CC scheduling according to an embodiment of the present invention.

FIG. 18 is different from FIG. 17 in terms of how to use collided subframes. That is, referring to FIG. 18(b), it is set that only U of an SCC and U of a PCC are used in the collided subframes SF#3 and SF#7 occurred as the result of application of a half-duplex operation scheme.

Referring to FIG. 18(c), there is illustrated a UL-DL configuration selected in a case in which a common UL grant/PHICH timing scheme according to an embodiment of the present invention is applied. A UL-DL configuration in which U is set for SF#2, #3, and #7 set to U or X for a PCC is selected. For example, in Table 1, UL-DL configurations #0, #1, and #6 correspond to the above configuration. A UL-DL configuration having the smallest number of U may be selected from among the three UL-DL configurations. For example, since the number of U in UL-DL configuration #0 is 6, the number of U in UL-DL configuration #1 is 4, and the number of U in UL-DL configuration #6 is 5, UL-DL configuration #1 may be selected. Consequently, UL grant/PHICH timing set according to UL-DL configuration #1 may be applied.

In a case in which cross-CC scheduling is not set, on the other hand, UL grant or PHICH timing set according to a UL-DL configuration of any CC (for the sake of convenience, referred to as an XCC) may be applied to UL data transmission in the XCC without modification. In a case in which XCCs operate based on a half-duplex operation scheme while having different UL-DL configurations, however, collided subframes may occur among the XCCs. In the collided subframes, some XCCs having one link direction may be used and XCCs having other link directions may not be used. Even when UL grant or PHICH timing is applied according to a UL-DL configuration of a specific XCC without modification, therefore, collided subframes may occur in subframe timing corresponding to the UL grant or PHICH timing with the result that subframe timing corresponding to the UL grant or PHICH timing of the specific XCC may not be used. In order to solve this problem, a collided subframe configuration in which D (for the sake of convenience, referred to as ctrl-D) set to transmit and receive a UL grant or PHICH is not set to X may be used in a case in which cross-CC scheduling is not set in an embodiment of the present invention.

Table 12 indicates ctrl-D in the UL-DL configurations of FIG. 1. In Table 12, ctrl-D is bolded and enlarged.

TABLE 12

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 19 illustrates a method of setting a collided subframe configuration in a case in which cross-CC scheduling is not set according to an embodiment of the present invention.

Referring to FIG. 19(a), there is illustrated carrier aggregation between XCC1 set to UL-DL configuration #2 and XCC2 set to UL-DL configuration #3. In this case, collided subframe timing corresponds to SF#3, #4, and #7. In this example, it is assumed that only U is set for use in collided subframes.

FIG. 19(b) shows a result to which a collided subframe configuration method according to an embodiment of the present invention is applied. In this example, only U is set for use in collided subframes. Since XCC1 is set to ctrl-D in SF#3, however, D of XCC1 is not set to X. That is, U of XCC2 is set to X. D of XCC1 in SF#4 and D of XCC2 in SF#7 are set to X since they are not ctrl-D. In case of SF#4 and SF#7, subframes having one direction may be used according to another rule.

Meanwhile, when referring to Tables 1 and 7 to 10 in detail, the number of UL subframes is defined to vary per UL-DL configuration and the number of UL HARQ processes and HARQ Round Trip Time (RTT) based thereupon are also differently set per UL-DL configuration. HARQ RTT may mean a time interval (unit of subframe (SF) or ms) from a time when a UL grant is received to a time when a PHICH corresponding to a PUSCH transmitted through PUSCH transmission corresponding to the received UL grant is received or a time interval from a PUSCH transmission time to a PUSCH retransmission time corresponding thereto. Considering that a TDD subframe structure is repeated in units of 10 [SFs or ms] and, therefore, RTT of a UL HARQ process is generally 10 [SFs or ms] in TDD, it may be efficient to use, for example, 10 [SFs or ms] or a multiple of 10 [SFs or ms] as the RTT of the UL HARQ process.

Table 13 lists HARQ RTT for UL-DL configurations of Table 1. As can be seen from Table 13, UL HARQ RTT is 10 [SFs or ms] in UL-DL configurations #1, #2, #3, #4, and #5 and UL HARQ RTT is not 10 [SFs or ms] in UL-DL configurations #0 and #6. In a case in which UL HARQ RTT is 10 [SFs or ms], each UL HARQ process may use only fixed UL subframe timing. On the other hand, in a case in which UL HARQ RTT is not 10 [SFs or ms], each UL HARQ process may not use fixed UL subframe timing but may use a plurality of UL subframe timings while hopping. For the sake of convenience, a UL-DL configuration in which UL HARQ RTT is not 10 [SFs or ms] is referred to as a non-10 ms UL-DL configuration.

TABLE 13

| DL-UL configuration | # of UL SFs | # of HARQ processes | HARQ RTT |
|---|---|---|---|
| #0 | 6 | 7 | 11 or 13 |
| #1 | 4 | 4 | 10 |
| #2 | 2 | 2 | 10 |
| #3 | 3 | 3 | 10 |
| #4 | 2 | 2 | 10 |
| #5 | 1 | 1 | 10 |
| #6 | 5 | 6 | 11 or 13 or 14 |

In a case in which a common UL grant/PHICH scheme is applied in a TDD carrier aggregation system which operates based on a half-duplex scheme and in which cross-CC scheduling is set, therefore, UL grant or PHICH timing for UL data transmission in a specific MCC/SCC combination may be decided as UL grant or PHICH timing set in a non-10 ms UL-DL configuration. In a case in which the corresponding UL grant or PHICH timing is applied, however, X may be included in a plurality of UL subframe timings used by each UL HARQ process while hopping. For example, according to the common UL grant/PHICH scheme, in a case in which SF#4 and #7 of an MCC become U or X, SF#4 and #8 of the MCC become U or X, or SF#9 of the MCC becomes U or X, UL grant or PHICH timing for UL data transmission for the MCC may be decided as UL grant or PHICH timing UL-DL configuration #0 or #6. In addition, in this case, at least one of SF#4, #7, #8 and #9 of the MCC may be set to X.

Consequently, the following schemes may be applied to a combination of an MCC/SCC UL-DL configuration decided as UL grant or PHICH timing of a non-10 ms UL-DL configuration through application of a common UL grant/PHICH scheme and a collided subframe configuration.

0) Common UL grant or PHICH timing may be applied without modification but UL HARQ RTT may be converted to N*10 SFs or N*10 ms (N being an integer equal to or greater than 1 and preferably 1 or 2) based on the following method 0 or 0-1 and may used, 1) common UL grant or PHICH timing may be applied without modification but UL data transmission may be skipped only for X included in a plurality of UL subframe timings used by one UL HARQ process while hopping and UL grant (and/or PHICH) scheduling/reception accompanying UL data transmission in the corresponding X may be omitted (method 1), 2) a collided subframe configuration may be restricted such that an MCC is not set to X in SF #4 and #9 in a case in which the MCC corresponds to UL-DL configurations #1 and #2, the MCC is not set to X in SF #7, #8, and #9 in a case in which the MCC corresponds to UL-DL configuration #3, and the MCC is not set to X in both SF #4 and, #7, both SF #4 and #8, or SF #9 in a case in which the MCC corresponds to UL-DL configurations #4 and #5, 3) cross-CC scheduling setting may not be allowed, or 4) carrier aggregation may not be allowed Method 0

A timing relationship between a UL grant/PHICH→a PUSCH may comply with common UL grant or PHICH timing according to a UL grant or PHICH timing scheme. For the sake of convenience, a time difference therebetween (between a UL grant/PHICH→a PUSCH) is expressed as K SFs or K ms.

A timing relationship between a PUSCH→a PHICH/UL grant may be set such that a time difference between a UL grant/PHICH→a PUSCH→a UL grant/PHICH is N*10 SFs or N*10 ms. For the sake of convenience, a time difference therebetween (between a PUSCH→a PHICH/UL grant) is expressed as L SFs or L ms. N is an integer equal to or greater than 1 and preferably 1 or 2.

Method 0-1

Common UL grant or PHICH timing may be applied to PUSCH transmission in SF #n to set a timing relationship between a UL grant→a PUSCH. For the sake of convenience, a time difference therebetween is expressed as K SFs or K ms.

Common UL grant or PHICH timing may be applied to PUSCH transmission in SF #n to set a timing relationship between a PUSCH→a PHICH. For the sake of convenience, a time difference therebetween is expressed as L SFs or L ms.

Finally, a timing relationship between a PHICH→a UL grant may be set such that PUSCH transmissions at intervals of N*10 SFs or N*10 ms constitute one equal PUSCH HARQ process. That is, a time difference between the PHICH and the UL grant may be set to N*10−K−L (not 0). N is an integer equal to or greater than 1 and preferably 1 or 2.

For example, a PUSCH in SF #n, a PHICH in SF #(n+L), a UL grant in SF #(n+L+(N*10−K−L))=SF #(n+N*10−K), and a PUSCH in SF #(n+N*10−K+K)=SF #(n+N*10) may be assigned to constitute one equal PUSCH HARQ process Consequently, from the viewpoint of PUSCH transmission, in a case in which the user equipment receives a PHICH in an MCC of SF #(n−K−(N*10−K−L))=#(n−K−H)=#(n−L)=#(n−(N*10−L)) and/or receives a UL grant in an MCC of SF #(n−K), the user equipment may transmit a PUSCH in an SCC of SF #n. Whether the PUSCH is initially transmitted or retransmitted may be decided depending upon whether a PHICH has been received and content of a UL grant (for example, whether a New Data Indicator (NDI) has been toggled).

For reference, an application example of method 0-1 is as follows. In a situation in which UL-DL configuration #6 is decided according to a common UL grant/PHICH timing scheme, 20 [TTI] UL HARQ RTT-based UL grant/PHICH timing for PUSCH transmission in SF #3 may be set as follows with reference to Tables 7, 9, and 10. A unit of TTI may be subframe (SF) or ms.

Common UL grant or PHICH timing, i.e. UL grant/PHICH timing set in UL-DL configuration #6, may be applied to PUSCH transmission in SF #3 to set a timing relationship between a UL grant→a PUSCH, i.e. a time interval K [TTI].

Referring to Table 7, a timing difference between a UL grant in SF #6→a PUSCH in SF #(10+3) is K=7 [TTI].

Common UL grant or PHICH timing, e.g. UL grant/PHICH timing set in UL-DL configuration #6, may be applied to PUSCH transmission in SF #3 to set a timing relationship between a PUSCH→a PHICH, i.e. a time interval L [TTI].

Referring to Table 7, a timing difference between a PHICH in SF #3→a PHICH in SF #9 is L=6 [TTI].

A timing relationship between a PHICH→a UL grant, i.e. a time interval 20−K−L [TTI] may be decided such that PUSCH transmissions in SF #3 having intervals of 20 [TTI] constitute one equal PUSCH HARQ process.

When the above result is applied, a timing difference between the PHICH→the UL grant is 20−K−L=20−7−6=7 [TTI].

As a result, a PUSCH in SF #3, a PHICH in SF #(3+L), a UL grant in SF #(9+(20−K−L))=SF #16, and a PUSCH in SF #(16+K)=SF #23 may be assigned to constitute one equal PUSCH HARQ process.

On the other hand, a scheme in which only DL/UL of an MCC (or a PCC) is always used for all collided subframes without considering an additional collided subframe configuration may be considered. That is, DL/UL of an SCC is not always used in all collided subframes. In this case, during cross-CC scheduling, UL grant or PHICH timing set in a DL/UL configuration of the MCC may be applied as UL grant or PHICH timing for UL data transmission. In addition, ACK/NACK timing set in a DL/UL configuration of the PCC may be applied as ACK/NACK timing. Even at this time, the following scheme may be applied to an MCC/SCC (or PCC/SCC) UL-DL configuration combination decided as UL grant or PHICH timing set in a non-10 ms UL-DL configuration. For example, the following scheme may be applied to a case in which an MCC (or a PCC) corresponds to UL-DL configuration #0 or #6.

0) A set corresponding UL grant or PHICH timing may be applied without modification but, only for an SCC to which the corresponding timing is applied, UL HARQ RTT may be converted to N*10 SFs or N*10 ms (N being an integer equal to or greater than 1 and preferably 1 or 2) based on the following method 0 or 0-1 and may used, 1) a set corresponding UL grant or PHICH timing may be applied without modification but, only for an SCC to which the corresponding timing is applied, UL data transmission may be skipped only for X included in a plurality of UL subframe timings used by one UL HARQ process while hopping (UL grant (and/or PHICH) scheduling/reception accompanying UL data transmission in the corresponding X may be omitted) (method 1), 2) cross-CC scheduling setting may not be allowed (for both a DL/UL or only for a UL), 3) carrier aggregation may not be allowed (for both a DL/UL or only for a UL), or 4) UL data scheduling/transmission for a corresponding SCC may be abandoned when cross-CC scheduling is set.

Embodiment 3

Meanwhile, additional cross-subframe (cross-SF) scheduling may be required during cross-CC scheduling based on a scheme of always using only DL/UL of PCC for all collided subframes in a situation of CA between CCs having different TDD UL-DL configurations. The cross-SF scheduling may mean scheduling, in a DL subframe #n of CC1, DL data to be transmitted in a DL subframe #(n+k) of CC2. In order to prevent introduction of such a cross-SF scheduling operation, the following ACK/NACK timing setting rules are proposed.

ACK/NACK Timing

ACK/NACK for DL data received through PCC

ACK/NACK timing configured in PCC may be applied without modification.

ACK/NACK for DL data received through SCC

ACK/NACK timing configured in PCC may be applied. However, in non-cross-CC scheduling, scheduling for D of the corresponding SCC may be abandoned for collided subframes in which PCC is U and SCC is D, and in cross-CC scheduling, scheduling for D of the corresponding SCC may be abandoned for collided subframes in which MCC configured to cross-CC schedule the PCC or the corresponding SCC is U and the corresponding SCC is D.

In case of D of the SCC, scheduling of which is abandoned, the UE may skip a detection/reception operation for a DL grant PDCCH scheduling the corresponding D and/or DL data transmitted in the corresponding D, and may not configure ACK/NACK information/bits and ACK/NACK timing for the corresponding D.

Embodiment 4—UL Grant or PHICH Timing of SCC During Non-Cross-CC Scheduling

In a situation in which cross-CC scheduling is not configured based on a scheme of always using a DL/UL of MCC only (or PCC only) for all collided subframes, UL grant or PHICH timing according to a UL-DL configuration of SCC may be applied for UL data transmission in the corresponding SCC without modification. In this case, ctrl-D configured to transmit a UL grant or PHICH when the corresponding SCC operates alone may be inevitably configured to X due to U of MCC (or PCC). For this reason, proposed is applying UL grant or PHICH timing configured according to a UL-DL configuration of MCC (or PCC) to UL data transmission in the SCC in a situation in which cross-CC scheduling is not configured.

For example, when UL grant or PHICH timing configured according to a UL-DL configuration of an SCC is applied (for UL data transmission in the SCC) without modification in a situation in which cross-CC scheduling is not configured, UL grant or PHICH timing configured according to a UL-DL configuration of an MCC (or a PCC) may be applied only in a case in which ctrl-D of the corresponding SCC is configured to X. Otherwise, UL grant or PHICH timing configured according to the UL-DL configuration of the corresponding SCC may be applied without modification.

In another example, in a case in which an MCC (or a PCC) is configured to D (or ctrl-D) and an SCC is configured to U in the same situation, the SCC may be configured to X since a collided subframe configuration is configured according to the MCC (or the PCC). In this case, however, a subframe of the SCC configured to X does not correspond to UL grant or PHICH timing and, therefore, there is no problem in applying UL grant or PHICH timing according to the UL-DL configuration of the SCC without modification.

Consequently, UL grant or PHICH timing configured according to the UL-DL configuration of MCC (or PCC) may be applied only in a case in which ctrl-D of SCC becoming UL grant or PHICH timing for an SF in which both MCC (or PCC) and SCC are U when UL grant or PHICH timing configured according to the UL-DL configuration of SCC is applied without modification is set to X and/or only in a case in which a subframe including ctrl-D of MCC (or PCC) and U of SCC does not become UL grant or PHICH timing for an SF in which both MCC (or PCC) and SCC are U when UL grant or PHICH timing configured according to the UL-DL configuration of MCC (or PCC) is applied without modification. Otherwise, UL grant or PHICH timing configured according to the UL-DL configuration of the corresponding SCC may be applied without modification.

Table 14 lists CCs becoming reference of UL grant or PHICH timing for UL data transmission in an SCC decided through a method according to this embodiment based on Table 13. For example, in a case in which an MCC (or a PCC) is set to UL-DL configuration #1 and an SCC is set to UL-DL configuration #3, an CC becoming reference of UL grant or PHICH timing for UL data transmission in the SCC is an MCC (or a PCC).

TABLE 14

| DL-UL Configuration (MCC or PCC) | DL-UL configuration (SCC) | | | | | | |
|---|---|---|---|---|---|---|---|
| | #0 | #1 | #2 | #3 | #4 | #5 | #6 |
| #0 | — | MCC/PCC | MCC/PCC | MCC/PCC | MCC/PCC | MCC/PCC | MCC/PCC |
| #1 | SCC | — | MCC/PCC | MCC/PCC | MCC/PCC | MCC/PCC | SCC |
| #2 | SCC | SCC | — | SCC | MCC/PCC | SCC | SCC |
| #3 | SCC | SCC | SCC | — | MCC/PCC | SCC | SCC |
| #4 | SCC | SCC | SCC | SCC | — | SCC | SCC |
| #5 | SCC | SCC | SCC | SCC | SCC | — | SCC |
| #6 | SCC | MCC/PCC | MCC/PCC | MCC/PCC | MCC/PCC | MCC/PCC | — |

In addition, in a case in which the UL grant/PHICH timing scheme according to embodiments of the present invention is applied as previously described, a specific D (XCC-D1) of an MCC or an SCC which is not set to transmit a UL grant or PHICH may be set as UL grant or PHICH timing for PUSCH transmission in a specific U of the MCC/SCC when the MCC or the SCC operates alone. In this case, since the original XCC-D1 is not set to receive a UL grant or PHICH, it is not possible for the user equipment to perform a PHICH-based HARQ process. Consequently, U (or all Us set in CCs including corresponding U) of an MCC/SCC in which UL grant or PHICH timing is set in XCC-D1 may be used for one-time UL data transmission depending only upon an instantaneous UL grant without an accompanying PHICH-based HARQ operation. This may be considered as a scheme in which a HARQ operation is continuously performed but retransmission is performed depending only upon whether a UL grant has been detected/received without execution of a PHICH detection/reception operation and non-adaptive automatic retransmission based thereon. For example, only in a case in which the user equipment receives a UL grant in XCC-D1, a PUSCH or UCI information (for example, ACK/NACK and/or CQI/PMI/RI, etc.) may be transmitted. Alternatively, a scheme in which PUSCH scheduling/transmission is restricted for U (or all Us set in CCs including corresponding U) of an MCC/SCC set in XCC-D1 and the U is used for another use may be considered. For example, only PUCCH and/or SRS and/or PRACH transmission may be allowed in the corresponding U.

Figure 20:
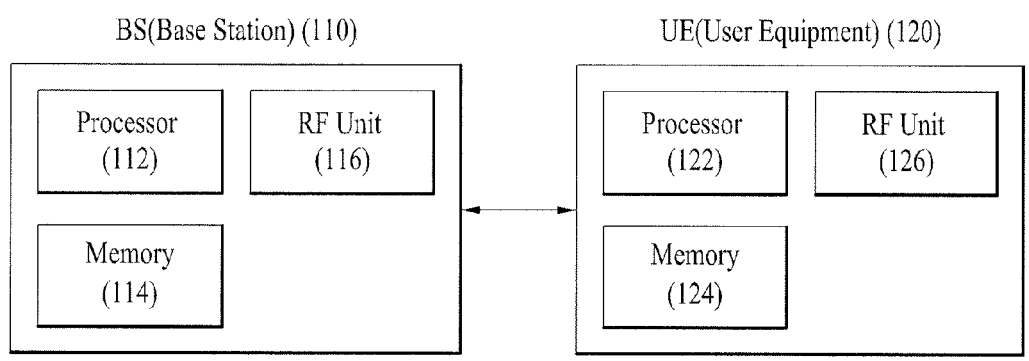
FIG. 20 illustrates a base station and a user equipment applicable to the present invention.

FIG. 20 illustrates a base station, a relay, and a user equipment applicable to the present invention.

Referring to FIG. 20, a wireless communication system includes a base station (BS) 110 and a user equipment (UE) 120. In a case in which the wireless communication system includes a relay, the base station or the user equipment may be replaced with the relay.

The base station 110 includes a processor 112, a memory 114, and a radio frequency (RF) unit 116. The processor 112 may be configured to execute procedures and/or methods proposed by the present invention. The memory 114 is connected to the processor 112 to store various kinds of information related to operation of the processor 112. The RF unit 116 is connected to the processor 112 to transmit and/or receive a radio signal. The user equipment 120 includes a processor 122, a memory 124, and an RF unit 126. The processor 122 may be configured to execute procedures and/or methods proposed by the present invention. The memory 124 is connected to the processor 122 to store various kinds of information related to operation of the processor 122. The RF unit 126 is connected to the processor 122 to transmit and/or receive a radio signal.

The embodiments of the disclosure described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, the description mainly focused on a signal transmission and reception relationship between a relay and a base station. Such a signal transmission and reception relationship may be identically or similarly applied to signal transmission and reception between a user equipment and a base station and between a user equipment and a relay. In this disclosure, a specific operation described as being performed by the base station may be performed by an upper node of the base station according to circumstances. That is, it is apparent that, in a network comprised of a plurality of network nodes including a base station, various operations performed for communication with a user equipment may be performed by the base station or network nodes other than the base station. The term 'base station' may be replaced with a fixed station, a Node B, an evolved Node B (eNode B or eNB), an access point, etc. In addition, the term 'user equipment' may be replaced with a mobile station (MS), a mobile subscriber station (MSS), etc.

Embodiments of the present invention may be achieved by various means, for example, hardware, firmware, software, or a combination thereof. In a hardware configuration, an embodiment of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

The present invention may be used in a wireless communication apparatus, such as a user equipment, a relay, or a base station.

What is claimed is:

1. A method for transmitting an uplink (UL) signal by a user equipment (UE) in a wireless communication system supporting carrier aggregation, the UE being configured with a plurality of cells including a first cell and a second cell, the first cell and the second cell operating in time division duplex (TDD) and having different TDD uplink-downlink (UL-DL) configurations, the method comprising:
   determining, by the UE, a specific TDD UL-DL configuration having a smallest number of D subframes from among one or more TDD UL-DL configurations, each of the one or more TDD UL-DL configurations being configured as a D subframe in each D subframe of the first cell and the second cell, the D subframe indicating a downlink (DL) subframe or a subframe comprising a downlink period, a guard period, and an uplink period; and
   transmitting, by the UE, a control signal in a UL subframe in response to at least one downlink signal received in at least one D subframe, the UL subframe being associated with the at least one D subframe according to the determined specific TDD UL-DL configuration.

2. The method according to claim 1, wherein the at least one downlink signal is received on the first cell and the control signal is transmitted on the first cell.

3. The method according to claim 1, wherein the at least one downlink signal is received on the second cell and the control signal is transmitted on the first cell.

4. The method according to claim 1, wherein the first cell is a primary cell and the second cell is a secondary cell.

5. The method according to claim 1, wherein the control signal includes a hybrid automatic repeat request acknowledgment (HARQ-ACK) signal.

6. The method according to claim 1, wherein the at least one downlink signal includes at least one physical downlink shared channel (PDSCH) signal or at least one physical downlink control channel signal (PDCCH) signal indicating a semi-persistent scheduling (SPS) release.

7. The method according to claim 1, wherein a subframe configuration on the first cell or the second cell is determined based on a TDD UL-DL configuration of a corresponding cell according to the following table:

| TDD UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |

-continued

| TDD UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 4 | D | S | U | U | D | D | D | D | D | D |
| 5 | D | S | U | D | D | D | D | D | D | D |
| 6 | D | S | U | U | U | D | S | U | U | D. |

8. The method according to claim 1, wherein an association k between at least one D subframe n-k and a UL subframe n is determined according to a TDD UL-DL configuration based on the following table:

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

9. The method according to claim 1, wherein the control signal is transmitted via a physical uplink control channel (PUCCH).

10. The method according to claim 1, wherein the control signal is transmitted via a physical uplink shared channel (PUSCH).

11. A user equipment configured to transmit an uplink (UL) signal in a wireless communication system supporting carrier aggregation, the user equipment being configured with a plurality of cells including a first cell and a second cell, the first cell and the second cell operating in time division duplex (TDD) and having different TDD uplink-downlink (UL-DL) configurations, the user equipment comprising:
   a Radio Frequency (RF) unit; and
   a processor configured to:
      determine a specific TDD UL-DL configuration having a smallest number of D subframes from among one or more TDD UL-DL configurations, each of the one or more TDD UL-DL configurations being configured as a D subframe in each D subframe of the first cell and the second cell, the D subframe indicating a downlink (DL) subframe or a subframe comprising a downlink period, a guard period, and an uplink period, and
      transmit a control signal in a UL subframe in response to at least one downlink signal received in at least one D subframe through the RF unit, the UL subframe being associated with the at least one D subframe according to the determined specific TDD UL-DL configuration.

12. The user equipment according to claim 11, wherein the at least one downlink signal is received on the first cell and the control signal is transmitted on the first cell.

13. The user equipment according to claim 11, wherein the at least one downlink signal is received on the second cell and the control signal is transmitted on the first cell.

14. The user equipment according to claim 11, wherein the first cell is a primary cell and the second cell is a secondary cell.

15. The user equipment according to claim 11, wherein the control signal includes a hybrid automatic repeat request acknowledgment (HARQ-ACK) signal.

16. The user equipment according to claim 11, wherein the at least one downlink signal includes at least one physical downlink shared channel (PDSCH) signal or at least one physical downlink control channel signal (PDCCH) signal indicating a semi-persistent scheduling (SPS) release.

17. The user equipment according to claim 11, wherein a subframe configuration on the first cell or the second cell is determined based on a TDD UL-DL configuration of a corresponding cell according to the following table:

| TDD UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

18. The user equipment according to claim 11, wherein an association k between at least one D subframe n-k and a UL subframe n is determined according to a TDD UL-DL configuration based on the following table:

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

19. The user equipment according to claim 11, wherein the control signal is transmitted via a physical uplink control channel (PUCCH).

20. The user equipment according to claim 11, wherein the control signal is transmitted via a physical uplink shared channel (PUSCH).

* * * * *